United States Patent
Nakamura et al.

(10) Patent No.: US 10,104,451 B2
(45) Date of Patent: Oct. 16, 2018

(54) IP UNCOMPRESSED VIDEO ENCODER AND DECODER

(71) Applicant: MEDIA GLOBAL LINKS CO., LTD., Kawasaki-shi, Kanagawa (JP)

(72) Inventors: Kazunori Nakamura, Kawasaki (JP); Kazuki Narita, Kawasaki (JP); Sho Hongo, Kawasaki (JP); Koji Nakao, Tokyo (JP); Hiroyuki Terasaki, Tokyo (JP); Hirokazu Arai, Tokyo (JP); Masaaki Kojima, Tokyo (JP); Yukiyo Asakura, Tokyo (JP)

(73) Assignee: MEDIA GLOBAL LINKS CO., LTD., Kanagawa (JP)

( * ) Notice: Subject to any disclaimer, the term of this patent is extended or adjusted under 35 U.S.C. 154(b) by 0 days.

(21) Appl. No.: 15/637,768

(22) Filed: Jun. 29, 2017

(65) Prior Publication Data

US 2017/0303009 A1    Oct. 19, 2017

Related U.S. Application Data

(62) Division of application No. 14/781,389, filed as application No. PCT/JP2014/001861 on Mar. 28, 2014, now Pat. No. 9,794,650.

(30) Foreign Application Priority Data

Apr. 5, 2013 (JP) ................... 2013-079661
Apr. 5, 2013 (JP) ................... 2013-079662
Apr. 5, 2013 (JP) ................... 2013-079664

(51) Int. Cl.
*H04N 19/00* (2014.01)
*H04N 21/845* (2011.01)
(Continued)

(52) U.S. Cl.
CPC ......... *H04N 21/8458* (2013.01); *H04N 19/42* (2014.11); *H04N 19/44* (2014.11);
(Continued)

(58) Field of Classification Search
CPC ....................................................... H04N 19/00
(Continued)

(56) References Cited

U.S. PATENT DOCUMENTS 6,892,390 B1    5/2005  Lieberman et al.
8,713,617 B2 *  4/2014  Phillips ............... G06F 19/3418
                                                              725/153
(Continued)

FOREIGN PATENT DOCUMENTS

JP    2005-229296 A    8/2005
JP    2009-071705 A    4/2009
(Continued)

OTHER PUBLICATIONS

Shirai et al., "6-Gbit/s Uncompressed 4K Video IP Stream Transmission and OXC Stream Switching Trial Using JGN II," NTT Technical Review, Jan. 2007, vol. 5, No. 1, pp. 78-82.
(Continued)

*Primary Examiner* — Andy Rao
(74) *Attorney, Agent, or Firm* — Oliff PLC

(57) ABSTRACT

Provided is an IP uncompressed video encoder that converts an IP packet stream of uncompressed video to an IP packet stream of compressed video. The invention is a video encoder that produces an IP packetized stream of compressed video from an IP packetized stream of an uncompressed video signal, comprising: receiving means packetizing, from a network, one or a plurality of IP packetized streams of an uncompressed video signal; retrieving means for retrieving video data from the one or plurality of IP packetized streams of the uncompressed video signal; com-
(Continued)

pressing means for compressing the retrieved video data; and transmitting means configured to IP packetize video compressed by the compressing means to create and transmit a stream of compressed video.

5 Claims, 19 Drawing Sheets

(51) Int. Cl.
    *H04N 21/462* (2011.01)
    *H04N 19/44* (2014.01)
    *H04N 21/233* (2011.01)
    *H04N 21/81* (2011.01)
    *H04N 19/42* (2014.01)
    *H04N 21/854* (2011.01)
    *H04N 21/643* (2011.01)

(52) U.S. Cl.
    CPC ....... *H04N 21/233* (2013.01); *H04N 21/4622* (2013.01); *H04N 21/64322* (2013.01); *H04N 21/8193* (2013.01); *H04N 21/85406* (2013.01)

(58) Field of Classification Search
    USPC ........................................ 375/240.01–240.29
    See application file for complete search history.

(56) References Cited

U.S. PATENT DOCUMENTS

| | | |
|---|---|---|
| 2005/0076134 A1 | 4/2005 | Bialik et al. |
| 2009/0219930 A1 | 9/2009 | Dolganow et al. |
| 2009/0319845 A1 | 12/2009 | Liu et al. |
| 2011/0252265 A1 | 10/2011 | Iwami et al. |
| 2011/0265134 A1 | 10/2011 | Jaggi et al. |
| 2011/0304739 A1 | 12/2011 | Itakura |

FOREIGN PATENT DOCUMENTS

| | | |
|---|---|---|
| JP | 2009-141926 A | 6/2009 |
| JP | 2011-091760 A | 5/2011 |
| JP | 2011-223359 A | 11/2011 |
| JP | 2011-259365 A | 12/2011 |
| WO | 2010/047706 A1 | 4/2010 |

OTHER PUBLICATIONS

Jun. 24, 2014 International Search Report issued in International Patent Application No. PCT/JP2014/001861.

Oct. 6, 2015 International Preliminary Report on Patentability issued in International Patent Application No. PCT/JP2014/001861.

Apr. 1, 2016 Office Action issued in Australian Patent Application No. 2014247880.

Sep. 20, 2016 Extended European Search Report issued in EP 14780259.9.

Anonymous: "IP/MPLS Networks: Optimize Video Transport for Service Providers," Cisco, Jan. 4, 2011, XP055301535.

Anonymous: "Video Streaming as input over ethernet in order to encode at realtime," [Archive] Doom9's Forem, Jul. 16, 2009, XP055301551.

Thomas Eduards: "Uncompressed Video Over IP," TvTechnology, Jun. 28, 2010, XP0553401964.

\* cited by examiner

ENCODERS 1710-1 TO 1710-99 ─ 1801

COMPRESS HD-SDI VIDEO SIGNAL WITH H.264 CODING,
CONVERT TO IP PACKETS CONFORMING TO SMPTE 2022-1/2 SPECIFICATION,
TRANSMIT OVER 1 Gbps ETHERNET

IP OUTPUT VIDEO DECODER 1600 ─ 1802

RECEIVE IP PACKET STREAM, FORWARD TO IP DECODER UNIT
SELECTED BY RECEIVE SWITCH

IP OUTPUT VIDEO DECODER 1600 ─ 1803

AFTER CHECKING VALIDITY OF IP PACKET STREAM AND FILTERING BY
MAC ADDRESS AND IP ADDRESS, PERFORM ERROR CORRECTION BY FEC

IP OUTPUT VIDEO DECODER 1600 ─ 1804

EXTRACT MPEG-2 TS FROM WITHIN IP PACKET STREAM,
EXTRACT VIDEO DATA AND 8-CHANNEL AUDIO DATA FROM MPEG-2 TS

IP OUTPUT VIDEO DECODER 1600 ─ 1805

DECODE VIDEO DATA WITH H.264 CODING,
DECODE AUDIO SIGNAL WITH AAC

IP OUTPUT VIDEO DECODER 1600 ─ 1806

EMBED 8 CHANNELS OF AUDIO DATA INTO DECODED UNCOMPRESSED
VIDEO SIGNAL, PRODUCE UNCOMPRESSED VIDEO SIGNAL WITH EMBEDDED AUDIO

IP OUTPUT VIDEO DECODER 1600 ─ 1807

IP PACKETIZE UNCOMPRESSED VIDEO SIGNAL BASED
ON SMPTE 2022-6 SPECIFICATION

IP OUTPUT VIDEO DECODER 1600 ─ 1808

ADD FEC PACKETS TO IP PACKET STREAM, ATTACH MAC HEADER AND FCS,
TRANSMIT OVER 10 Gbps ETHERNET SELECTED BY TRANSMITTING-SIDE SWITCH

UNCOMPRESSED IP VIDEO RECEPTION
DEVICES 1720-1 TO 1720-99 ─ 1809

EXTRACT AND OUTPUT HD-SDI UNCOMPRESSED VIDEO SIGNAL
FROM IP PACKET STREAM

FIG.18

IP UNCOMPRESSED VIDEO ENCODER AND DECODER

This is a Division of application Ser. No. 14/781,389 filed Sep. 30, 2015, which in turn is a U.S. National Stage of PCT/JP2014/001861, filed Mar. 28, 2014, which claims foreign priority to: JP 2013-079661, filed Apr. 5, 2013; JP 2013-079662, filed Apr. 5, 2013; and JP 2013-079664, filed Apr. 5, 2013. The disclosure of the prior applications is hereby incorporated by reference herein in its entirety.

TECHNICAL FIELD

The present invention relates to a video encoder and decoder, and more particularly, to a video encoder that converts an IP packet stream of uncompressed video into an IP packet stream of compressed video, and a video decoder that converts an IP packet stream of compressed video into an IP packet stream of uncompressed video.

BACKGROUND ART

In a video encoder of the related art that compresses and transmits video, an uncompressed digital video signal such as 3G-SDI, HD-SDI, or SD-SDI is input, compressed using compression technology such as MPEG-2, 11.264, or JPEG 2000, and the compressed data is stored in MPEG-2 TS format and transmitted over DVB-ASI or Ethernet (registered trademark). In addition, in a video decoder of the related art, the data is received over DVB-ASI or Ethernet, which has been stored in MPEG-2 TS format and compressed using compression technology such as MPEG-2, and the compressed data is decoded and output as an uncompressed digital video signal such as 3G-SDI, HD-SDI, SD-SDI, or HDMI (registered trademark).

Regarding transmission of IP packet stream over Ethernet and reception of IP packet stream over Ethernet, video encoders and video decoders that transmit and receive using a packet format and forward error correction (FEC) scheme conforming to the SMPTE 2022-1/2 specification standardized by the Society of Motion Picture and Television Engineers (SMPTE) are increasing.

FIG. 1 includes diagram illustrating a video encoder of the related art. The video encoder 100 illustrated in FIG. 1 includes an HD-SDI input interface unit 101, an encoder control unit 102 that outputs video data and audio data from an input HD-SDI signal, an H.264 video encoder 103 that compresses and encodes retrieved video data, an AAC audio encoder 104 that compresses and encodes retrieved audio data, an MPEG-2 TS generator 105 that generates an MPEG-2 TS in which the compressed and encoded video data and the compressed and encoded audio data are multiplexed, a signal conversion unit 106 that IP packetizes the compressed video signal, and an IP output interface 107 that outputs a IP packet stream 120 of compressed video.

The video encoder 100 receives an HD-SDI uncompressed digital video signal 110 from a coaxial cable 111 with the HD-SDI input interface unit 101, compresses the video data with the H.264 video encoder 103, and compresses the audio data with the AAC audio encoder 104. Next, the compressed video and audio data is stored and multiplexed in MPEG-2 TS format by the MPEG-2 TS generator 105, IP packetized by the signal conversion unit 106, and an IP packet stream 120 of compressed video conforming to the SMPTE 2022-1/2 specification is transmitted from the IP output interface 107 over a 1 Gbps Ethernet 121.

FIG. 2 is a configuration diagram illustrating a video decoder of the related art. The decoder 200 illustrated in FIG. 2 includes an IP input interface unit 201, a signal extraction unit 202 that retrieves an MPEG-2 TS from an input IP packet stream, a decoder control unit 203 that outputs compressed video data and compressed audio data from the MPEG-2 TS, an H.264 video decoder 204 that decompresses and decodes the retrieved video data, an AAC audio decoder 205 that decompresses and decodes the retrieved audio data, an audio embedding unit 206 that generates an uncompressed video signal from the decompressed and decoded video data and audio data, and an HD-SDI output interface unit 207 that outputs the uncompressed video signal as an HD-SDI video signal.

The video decoder 200 receives an IP packet stream 210 of compressed video from a 1G Ethernet 211 with the IP input interface unit 201, and with the signal extraction unit 202, retrieves an MPEG-2 TS from the input IP packet stream 210. In the decoder control unit 203, the MPEG-2 TS extracted with the signal extraction unit 202 is separated into compressed video data and compressed audio data. The compressed video data and the compressed audio data is decompressed and decoded by the H.264 video decoder 204 and the AAC audio decoder 205, respectively. Next, in the audio embedding unit 206, the audio data is embedded into the decompressed and decoded video data to generate an uncompressed video signal, and the uncompressed video signal 220 is transmitted from the HD-SDI output interface unit 207 over the coaxial cable 221.

A video encoder that receives an uncompressed video signal such as 3G-SDI, HD-SDI, or SD-SDI is often used by being connected to a camera at a stadium or the like, or used when processing video inside a broadcasting station. Consequently, convenience of operation is important, and the above video encoder is convenient in that by simply connecting a coaxial cable carrying an uncompressed video signal to the input, a DVB-ASI signal carrying a compressed video signal may be obtained on the output coaxial cable, or a compressed video signal stored in the SMPTE 2022-2 format may be obtained on the output Ethernet.

However, regarding the video signal, only one data stream or one pair of data streams (in the case of 3G-SDI Level-B) is sent on one coaxial cable or optical fiber cable. For this reason, in a system in a broadcasting station or the like that handles multiple video data streams, it is necessary to install a number of video encoders proportional to the number of video data streams, or install a switching device such as a matrix switcher for selecting a video signal to input into the video encoder from among multiple uncompressed video signals. Likewise, for the video decoder, it becomes necessary to provide a number of video decoders proportional to the number of video data streams, as well as a switching device such as a matrix switcher for selecting the uncompressed video signal to use inside the broadcasting station from among the multiple uncompressed video signals output from these video decoders.

FIG. 3 is a diagram illustrating a video delivery system 300 provided with a number of video encoders of the related art in proportion to the number of video data streams. FIG. 4 is a diagram illustrating a video delivery system 400 provided with a matrix switcher. Both FIGS. 3 and 4 illustrates systems that collect video from a large number of arenas at a broadcasting center, and after compressing the video with video encoders, transmit the video to a broadcasting station.

In the system 300 of FIG. 3, video encoders 322-1 to 322-99 are includes in the broadcasting center 320 in order to encode each video from stadium 310-1 to 310-10. The videos compressed by the video encoders 322-1 to 322-99 are input into a video transmission unit 323, and in the video transmission unit 323, a specific video is selected, processed, and sent over an external network.

In the system 400 of FIG. 4, the matrix switcher 424 selects video signals to input into video encoders 422-1 to 422-2 from among video signals from stadiums 410-1 to 410-10. The videos compressed by the video encoders 422-1 to 422-2 are input into a video transmission unit 423, and after being processed, are sent over an external network.

An uncompressed video signal such as 3G-SDI, HD-SDI, or SD-SDI is ordinarily transmitted using coaxial cable. However, there is a distance limitation on the transmission of a video signal using coaxial cable. Therefore, in order to transmit the video signals of the stadiums 310-1 to 310-10 or 410-1 to 410-10 to the broadcasting center 320 or 420, equipment that converts an electrical signal into an optical signal is used, and the optical signal is transmitted over optical fiber cable. In FIG. 3, HD-SDI video signals output by cameras 311-1 to 311-99 are converted from electrical signals to optical signals using LID (electrical-to-optical) converters 312-1 to 312-99, transmitted over optical fiber, and at the broadcasting center 320, converted again from optical signals to electrical signals using O/E (optical-to-electrical) converters 321-1 to 321-99. Similarly, in FIG. 4, HD-SDI video signals output by cameras 411-1 to 411-99 are converted from electrical signals to optical signals using E/O converters 412-1 to 412-99, transmitted over optical fiber, and at the broadcasting center 420, converted again from optical signals to electrical signals using O/E converters 421-1 to 421-99.

Also, FIG. 5 is a diagram that illustrates a broadcasting station system 500 includes a number of video decoders of the related art in proportion to the number of video data streams, and illustrates a system that receives video from an external stadium or another broadcasting station, and delivers the video to an editing system, transmission system, and monitor group inside the broadcasting station.

In the system of FIG. 5, video from cameras 511-1 to 511-99 of arenas 510-1 to 510-10 is encoded inside each stadium using video encoders 512-1 to 512-99, and sent to the broadcasting station 520 via a 1 Gbps Ethernet. Compressed video from other broadcasting stations 531 and 532 is similarly sent to the broadcasting station 520 via the 1 Gbps Ethernet. The broadcasting station 520 is provided with video decoders 522-1 to 522-101 for decoding IP packet streams of compressed video received over the above 1 Gbps Ethernet. Each HD-SDI uncompressed video signal including video data decoded by the video decoders 522-1 to 522-101 is input into a matrix switcher 521. HD-SDI uncompressed video signals required by an editing system 524, a transmission system 525, and a monitor group 523 are selected by the matrix switcher 521, and output to the respective systems and the monitor group.

In this way, with the technology of the related art, in a sports broadcast system that broadcasts by switching video from multiple stadiums depending on the time, or a system that selects and compresses multiple video signals selectively from among a large number of uncompressed video signals, such as an internal distribution system of a broadcasting station that receives and distributes a large number of videos from outside sources, it is necessary to prepare video encoders individually for all uncompressed video signals in advance, or place a matrix switcher for video signals near a video encoder and switch the video to be encoded.

Additionally, in a system that receives video from multiple stadiums or other broadcasting stations and distributes the video in a broadcasting station, in order to link up with an uncompressed video signal processing system using coaxial cable in the broadcasting station, it is necessary to prepare video decoders individually for each IP packet stream received externally, and use a matrix switcher for video signals to select the signal required by each system in the broadcasting station from among the uncompressed video signals output by these video decoders.

With these systems, it is often necessary to install inactive equipment as illustrated in the example of FIG. 3, or in other words, video encoders must be prepared even for video from stadiums where broadcasting is not being conducted. At sports events such as the soccer World Cup and the Olympics, it is clearly unrealistic to reorganize the equipment according to the day-to-day competition schedule.

One method of reducing the number of inactive equipment is to take a configuration as illustrated in FIG. 4. However, the configuration in FIG. 4 requires the preparation of an extremely costly matrix switcher. Furthermore, the number of selected videos is limited by the number of physical ports on the matrix switcher, and there is a problem in that system flexibility is lost.

Furthermore, the system configuration in FIG. 5 requires the preparation of both a large number of video encoders and a matrix switcher, and system flexibility is also lost.

Another problem in the case of using the technology of the related art is the cost of constructing the transmission lines. As illustrated in FIGS. 3 and 4, converting a video signal from an electrical signal to an optical signal and then from an optical signal back to an electrical signal incurs the costs of purchasing and installing dedicated equipment. Furthermore, dedicated optical fiber service provided by a communications carrier under the name of dark fiber or the like incurs enormous service fees depending on the country. With these systems designed for coaxial cable, there is also a problem in that laying cable is laborious, and running cable in a broadcasting station or the like incurs enormous costs.

On the other hand, with recent advances in IT technology, broadcasting systems are transitioning to an Internet Protocol (IP) base. This trend is described in, for example, "Broadcasting Facilities and Operations", Journal of the Institute of Image Information and Television Engineers, Vol. 67, No. 5 (2013). IP-based systems are also coming to be used in video delivery systems. In these IP-based broadcasting systems, video signals are IP packetized and transmitted using the Real-Time Transport Protocol (RTP). Consequently, making a broadcasting system IP-based requires video encoders and video decoders designed to be used on an IP network.

However, encoders of the related art only receive an uncompressed digital video signal such as HD-SDI, store data compressed using compression technology such as H.264 in MPEG-2 TS format, and transmit the compressed data over Ethernet, like the encoder discussed earlier and illustrated in FIG. 1. Consequently, an encoder of the related art is unable to compress and encode uncompressed video until after an IP packet stream of uncompressed video goes through a process of being converted to an uncompressed digital video signal such as BD-SDI first.

In addition, video decoders of the related art can only receive data that has been stored in MPEG-2 TS format and compressed using compression technology such as MPEG-2 over Ethernet or the like, decode the compressed data, and output the result as an uncompressed digital video signal such as HD-SDI, like the video decoder illustrated in FIG.

2. Consequently, a decoder of the related art is only able to output decompressed digital video signal such as HD-SDI, then the output of the decoder is unable to deliver to IP network directly.

However, conducting IP/HD-SDI signal conversion first in this way requires a video transmission device that conducts IP/HD-SDI signal conversion in addition to the encoder or decoder, and the number of pieces of equipment increases.

SUMMARY OF INVENTION

An objective of the present invention is to solve the problems discussed above, and provide a video encoder and a video decoder making it possible to decrease the ratio of inactive equipment, and without requiring a costly matrix switcher, increase system flexibility and decrease costs for transmission line construction and the laying of cable. To achieve this objective, the present invention provides a video encoder and a video decoder designed to be used on an IP network.

The video encoder and video decoder of the present invention is a video encoder that produces an IP packetized stream of compressed video from an IP packetized stream of an uncompressed video signal.

To realize this function, the video encoder of the present invention includes: receiving means for receiving, from a network, one or a more IP packetized streams of an uncompressed video signal; retrieving means for retrieving video data from the received packetized stream of an uncompressed video signal; compressing means for compressing the retrieved video data; creating means for IP packetizing the compressed video data to create a stream of compressed video; and transmitting means for transmitting the IP packetized stream of compressed video. Thus, it becomes possible to retrieve video data from an IP packet stream of an uncompressed video signal received by the receiving means, compress the retrieved video data, create an IP packetized stream of compressed video from the compressed video data, and transmit the stream of compressed video over a network.

Furthermore, the video encoder of the present invention further may include retrieving means for retrieving audio data from an IP packetized stream of an uncompressed video signal, and compressing means for compressing the retrieved audio data. Thus, by having the transmitting means further include transmitting means for IP packetizing to transmit compressed audio, it becomes possible to compress, IP packetize, and transmit the retrieved audio data.

In addition, the video encoder of the present invention may include: receiving means for receiving one or a more IP packetized streams of uncompressed video; retrieving means for retrieving video data from the IP packetized stream of uncompressed video; compressing means for compressing the retrieved video data; transmitting means W packetizing video compressed by the compressing means to create and transmit a stream of compressed video; a receiving-side switch for distributing, to a plurality of the receiving means, IP packet streams received by the plurality of network interfaces; and a transmitting-side switch for distributing the IP packet streams created by the plurality of the transmitting means to a plurality of network interfaces. Thus, it becomes possible to use a switch on the receiving side to select, and distribute to the receiving means, a stream to be compressed from among IP packetized streams of uncompressed video signals received from a plurality of network interfaces, retrieve video data from an IP packet stream of an uncompressed video signal with the retrieving means, compress the retrieved video data, create an IP packetized stream of compressed video from the compressed video data, and transmit the stream of compressed video over a network.

Herein, regarding the receiving-side switch and the transmitting-side switch, depending on the configuration of the network applying the present invention, application is also possible in which the network interface and the receiving means are joined directly without a receiving-side switch, or in which the transmitting means and the network interface are joined directly without a transmitting-side switch.

In addition, in the case of a specific implementation of the present invention, the use of an Ethernet switch supporting Layer 2 or Layer 3 of the Open Systems Interface. (OSI) reference model as a switch is conceivable. Such switches commercialized by Broadcom. or Marvell Semiconductor are bidirectional switches, enabling the receiving-side switch and the transmitting-side switch to be realized using the same single switch.

Furthermore, the video encoder of the present invention further may include: retrieving means for retrieving audio data from the IP packetized stream of an uncompressed video signal; and compressing means for compressing the retrieved audio data. Thus, by having the transmitting means further include transmitting means for IP packetizing to transmit compressed audio, it becomes possible to compress, IP packetize, and transmit the retrieved audio data.

Furthermore, the video decoder of the present invention includes: receiving means for receiving one or a more IP packetized streams of compressed video data; retrieving means for retrieving compressed video data from the IP packetized stream of compressed video; decoding means for decoding the retrieved compressed video data; transmitting means IP packetizing the video decoded by the decoding means to create and transmit a stream of uncompressed video; a receiving-side switch for distributing, to a plurality of the receiving means, IP packet streams received from a plurality of network interfaces; and a transmitting; side switch for distributing the IP packet streams created by the plurality of the transmitting means to a plurality of network interfaces. Thus, it becomes possible to use a switch on the receiving side to select, and distribute to the receiving means, a stream to be decoded from among IP packet streams of compressed video data received from a plurality of network interfaces, retrieve compressed video data from an IP packet stream of compressed video data with the retrieving means, decode the retrieved compressed video data, create an IP packet stream of an uncompressed video signal from the decoded uncompressed video data, and transmit an IP packet stream of the uncompressed video over a network.

Herein, regarding the receiving-side switch and the transmitting-side switch, depending on the configuration of the network applying the present invention, application is also possible in which the network interface and the receiving means are joined directly without a receiving-side switch, or in which the transmitting means and the network interface are joined directly without a transmitting-side switch.

In addition, in the case of a specific implementation of the present invention, the use of an Ethernet switch supporting Layer 2 or Layer 3 of the OSI reference model as a switch is conceivable. Such switches commercialized by Broadcom or Marvell Semiconductor are bidirectional switches, enabling the receiving-side switch and the transmitting-side switch to be realized using the same single switch.

Furthermore, the video decoder of the present invention further may include: retrieving means to retrieving audio data from the IP packetized stream; decoding means for decoding the retrieved audio data; and embedding means for incorporating the decoded audio data into the IP packet stream of the uncompressed video signal. Thus, it becomes possible to use the decoding means to decode audio data retrieved by the retrieving means, and incorporate the decoded audio data into the IP packet stream of the uncompressed video signal.

According to the present invention, an IP packetized uncompressed video signal may be transmitted directly to an IP uncompressed video encoder of the present invention, and an IP packet stream of compressed video may be generated. Consequently, by using an IP network as the transmission line and utilizing IP network routing and switching, it is possible to decrease the ratio of inactive equipment in a video delivery system, and without using a costly matrix switcher, increase system flexibility and decrease costs for transmission line construction and the laying of cable. Additionally, since an uncompressed video signal may be encoded into a compressed video signal from inside the network, it becomes possible construct a completely new form of broadcasting network.

BRIEF DESCRIPTION OF DRAWINGS

FIG. 18 is a flowchart from creation of an IP packet stream of compressed video from uncompressed video up to outputting to HD-SDI on the receiving side in the video transmission system of FIG. 17.

DESCRIPTION OF EMBODIMENTS

Hereinafter, embodiments of the present invention will be described in detail and with reference to the drawings.

First Embodiment

Figure 6:
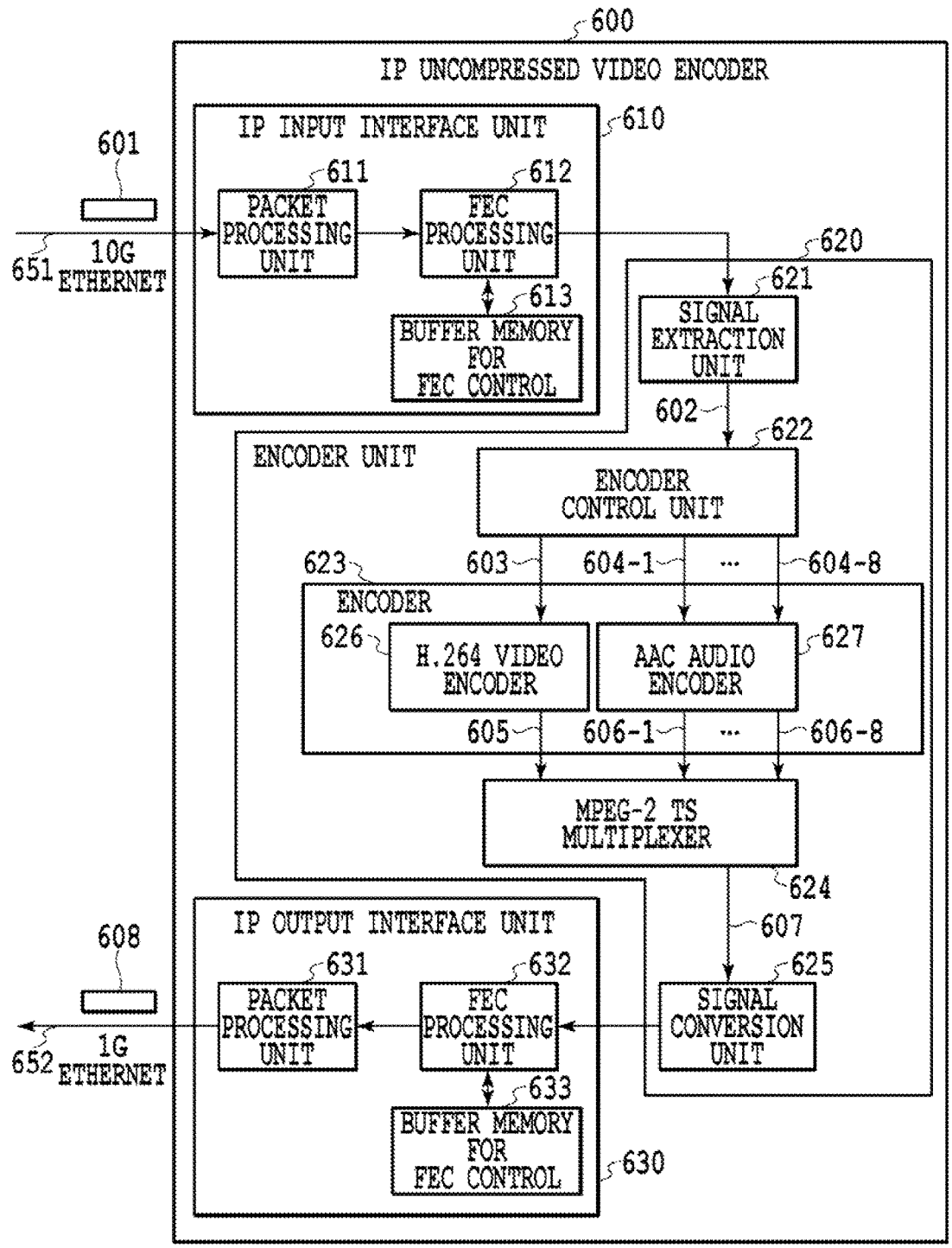
FIG. 6 is a configuration diagram illustrating an IP uncompressed video encoder according to a first embodiment of the present invention.

FIG. 6 is a configuration diagram illustrating an IP uncompressed video encoder according to a first embodiment of the present invention. The IP uncompressed video encoder illustrated in FIG. 6 receives an IP packet stream of uncompressed video in a packet format and FEC scheme conforming to SMPTE 2022-5/6 from a 10 Gbps Ethernet 651, and transmits an IP packet stream of compressed video conforming to the SMPTE 2022-1/2 specification to a 1 Gbps Ethernet 652.

Figure 7:
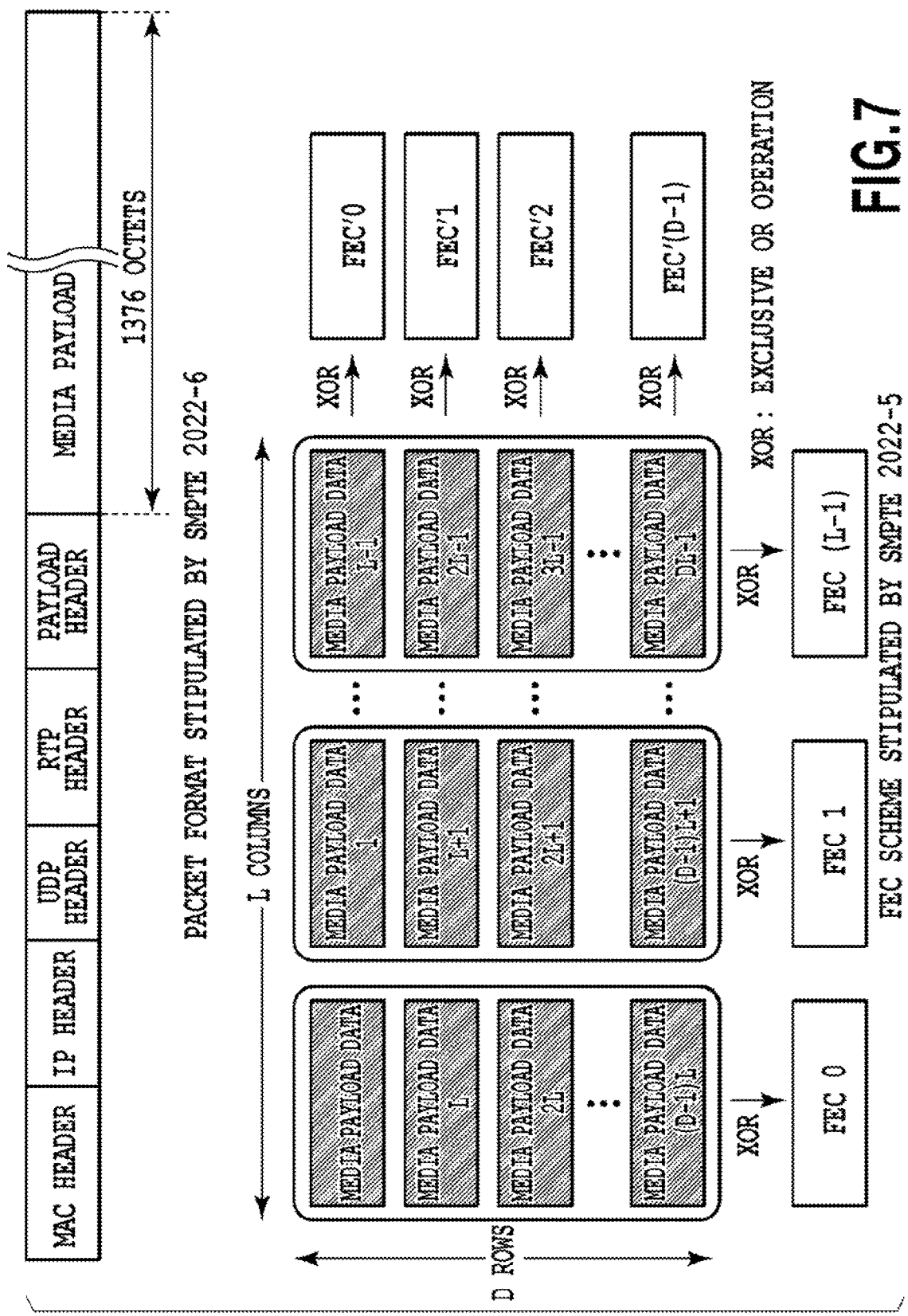
FIG. 7 is a diagram illustrating the FEC scheme and packet format stipulated by SMPTE 2022-5/6.

Herein, FIG. 7 illustrates the packet format stipulated by SMPTE 2022-6 and the FEC scheme stipulated by SMPTE 2022-5. Uncompressed video is loaded into and transmitted in the media payload field of the IP packet of FIG. 7. The media payload has a fixed length of 1376 octets. With the EEC scheme of SMPTE 2022-5 illustrated in FIG. 7, on the transmitting side, an exclusive OR computation is performed in row units and column units by creating an L×D matrix from the data in the media payload in the IP packet conforming to SMPTE 2022-6. By this computation of the data, FEC data is generated, and a dedicated FEC IP packet is created and transmitted. Meanwhile, on the receiving side, a matrix similar to the transmitting side is created, and the received SMPTE 2022-6 IP packet and FEC packet are used to perform an exclusive OR computation in row units and column units similarly to the transmitting side. Consequently, even if packet loss occurs, the lost packet may be reconstructed, SMPTE 2022-5 stipulates that possible FEC modes include support for rows only, support for rows and columns, selection of a number of rows and a number of columns, and the like, but since this lies outside the primary scope of the description related to the present invention, description thereof will be omitted.

Figure 8:
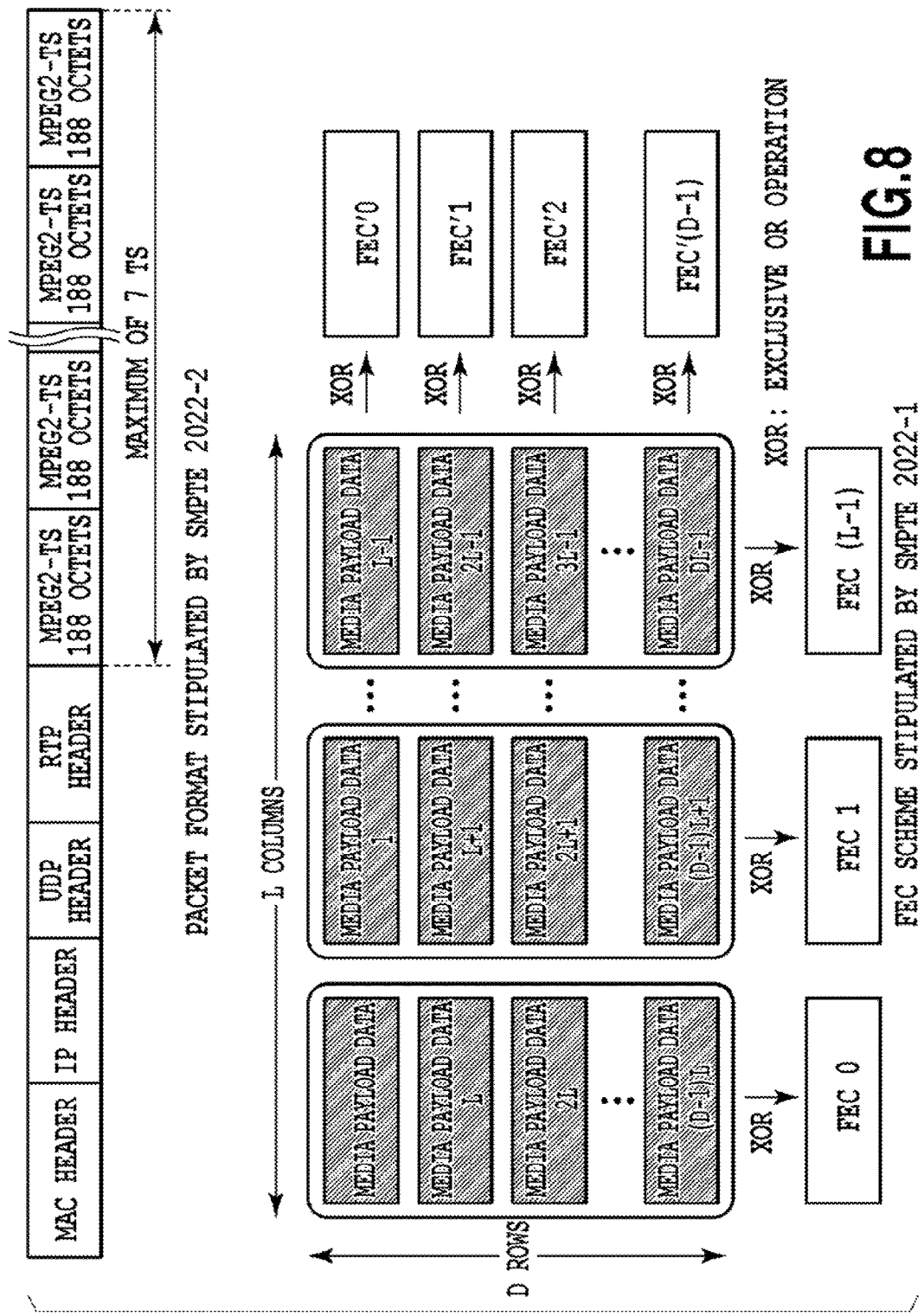
FIG. 8 is a diagram illustrating the FEC scheme and packet format stipulated by SMPTE 2022-1/2.

FIG. 8 illustrates the packet format stipulated by SMPTE 2022-2 and the FEC scheme stipulated by SMPTE 2022-1. Compressed video is loaded into and transmitted in the MPEG-2 TS payload field of FIG. 8. This field may carry a maximum of up to seven MPEG-2 TS. The FEC scheme of SMPTE 2022-1 illustrated in FIG. 8 has different restrictions on the size of the matrix and the like, but the basic operating principle is the same as in SMPTE 2022-5 of FIG. 7.

Returning again to FIG. 6, the IP uncompressed video encoder 600 illustrated in FIG. 6 includes an IP input interface unit 610 that receives an IP packet stream of uncompressed video, an encoder unit 620 that compresses and encodes the received IP packet stream of uncompressed video, and an IP output interface unit 630 that outputs the compressed IP packet stream. The IP input interface unit 610 includes a 10 Gbps Ethernet packet processing unit 611, an FEC processing unit 612, and buffer memory 613 for FEC control. The packet processing unit 611 inspects an IP packet stream 601 input from the 10 Gbps Ethernet 651 in the media access control (MAC) layer, the IP layer. The packet processing unit 611 the UDP layer, and the RTP layer, and forwards to the FEC processing unit 612 only IP packets for which the MAC address and the IP address match addresses required by the IP uncompressed video encoder 600, and for which the FCS inspection, packet length inspection, and checksum inspection results are correct. The FEC processing unit 612 writes IP packets from the packet processing unit 611 to the buffer memory 613 for FEC control, and also controls the FEC matrix as the receiving side. If the FEC processing unit 612 judges that the IP packets needed to construct a designated FEC matrix have all been written to the buffer memory 613, the FEC processing unit 612 reads out data for the relevant FEC matrix from the buffer memory 613, and by performing FEC computations, reconstructs lost packets and conducts an error correction process. The error-corrected IP packet stream is sent by the FEC processing unit 612 to the encoder unit 620.

The encoder unit 620 includes a signal extraction unit 621 that retrieves an uncompressed video signal from an IP packet stream input into the IP uncompressed video encoder, an encoder control unit 622 that receives the retrieved uncompressed video signal, and outputs video data and audio data, an encoder 623 that compresses and encodes the retrieved video data and audio data, an MPEG-2 TS multiplexer 624, and a signal conversion unit 625 that IP packetizes the compressed video signal.

The signal extraction unit 621 inspects RTP sequence numbers in the IP packet stream from the FEC processing unit 612 of the IP input interface unit 610, and for correct IP packets, removes the RTP, UDP, IP, and MAC headers, and extracts and forwards an uncompressed video signal 602 to the encoder control unit 622.

The encoder control unit 622 extracts video data 603 and audio data 604-1 to 604-8 from the uncompressed video signal 602 input from the signal extraction unit 621, and forwards the extracted data to the encoder 623. For the extraction of video data and audio data from a 3G-SDI, HD-SDI, or SD-SDI uncompressed video signal 602, extraction is conducted by extracting data from designated fields on the basis of the SMPTE 424M, 292M, or 259M standard, respectively. For the audio data, although 3G-SDI and HD-SDI support up to a maximum of 16 channels, in the present embodiment, 8 channels are encoded.

The encoder 623 includes of a video encoder 626 that compresses uncompressed video data according to H.264 coding, and an audio encoder 627 that compresses 8 channels of audio data into Advanced Audio Coding (AAC) audio.

The video encoder 626 receives the uncompressed video data 603 from the encoder control unit 622, and outputs a packetized elementary stream (PES) 605 of H.264 compressed video. The audio encoder 627 receives the audio data 604-1 to 604-8 from the encoder control unit 622, and outputs compressed audio PESs 606-1 to 606-8 compressed with AAC.

The MPEG-2 TS multiplexer 624 receives the compressed video PES 605 from the video encoder 626 and the compressed audio PESs 606-1 to 606-8 from the audio encoder 627, creates TS packets, and produces a multiplexed MPEG-2 TS 607.

The signal conversion unit 625 IP packetizes the MPEG-2 TS 607 on the basis of the SMPTE 2022-2 specification by inserting the MPEG-2 TS 607 into RTP payloads in units of 7 TS packets, and adding an RTP header, a UDP header, and an IP header.

The IP output interface unit 630 includes an FEC processing unit 632, buffer memory 633 for FEC control, and a 1 Gbps Ethernet packet processing unit 631. The FEC processing unit 632 writes IP packets from the signal conversion unit 625 into the buffer memory 633 for FEC control, and also controls the FEC matrix as the transmitting side. If the FEC processing unit 632 judges that the IP packets needed to construct a designated FEC matrix have all been written to the buffer memory 633, the FEC processing unit 632 reads out data for the relevant FEC matrix from the buffer memory 633, and by performing FEC computations, generates FEC packets. The FEC packets, as well as the IP packets from the signal conversion unit 625, are sent from the FEC processing unit 632 to the packet processing unit 631 in a designated order prescribed by SMPTE 2022-1.

The packet processing unit 631 attaches the MAC header and the FCS to the IP packets from the FEC processing unit 632, performs processing in the 1 Gbps Ethernet MAC sublayer, and transmits the IP packets 608 over the 1 Gbps Ethernet 652.

Figure 9:
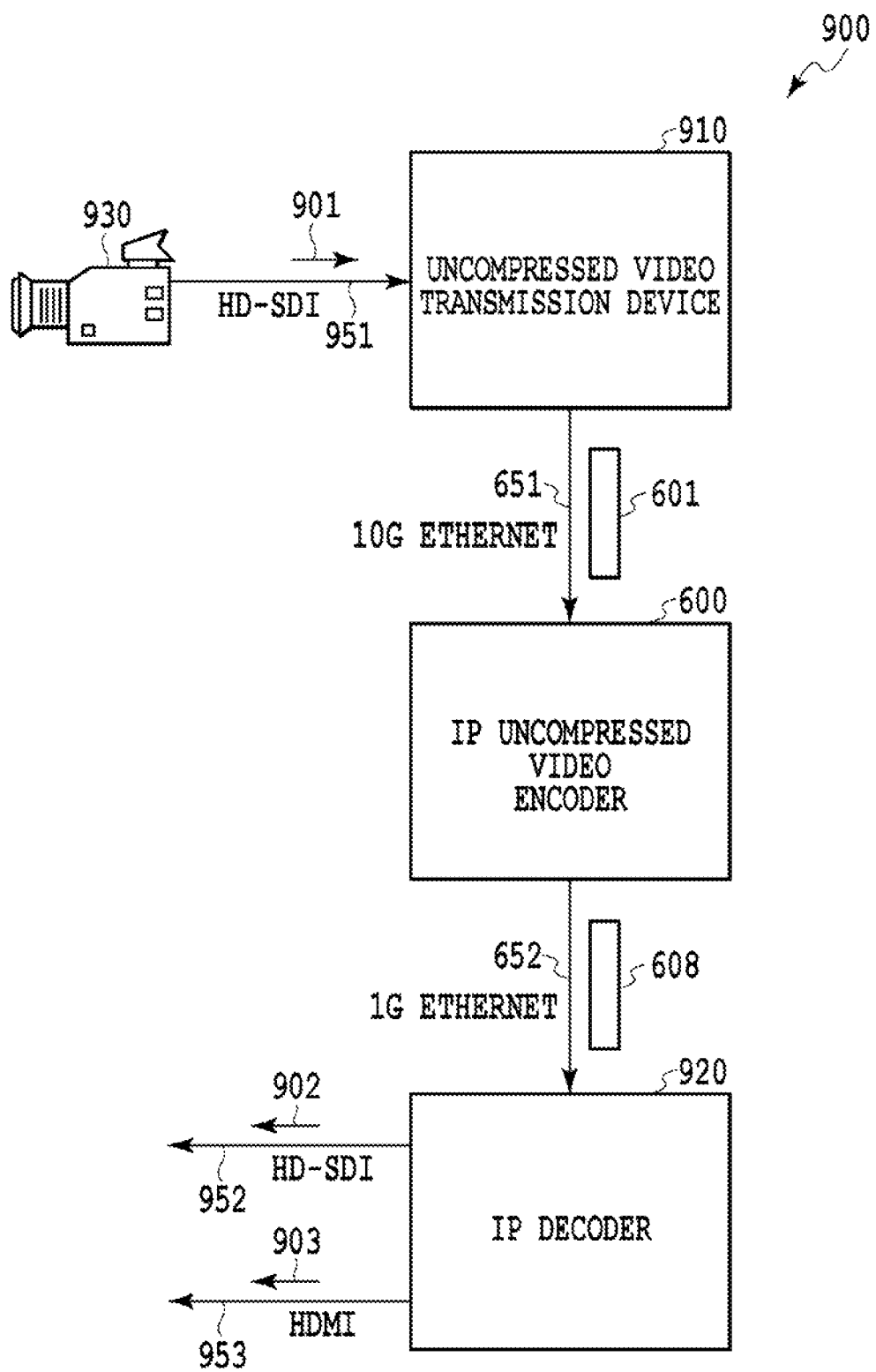
FIG. 9 is a configuration diagram of a video transmission system using the IP uncompressed video encoder of FIG. 6.

FIG. 9 is a configuration diagram illustrating a video transmission system 900, which is a video transmission system using the IP uncompressed video encoder 600 illustrated in FIG. 6. The video transmission system 900 includes a camera 930, an uncompressed video transmission device 910 connected to the camera 930 by a coaxial cable 951, the IP uncompressed video encoder 600 connected to the uncompressed video transmission device 910 by the 10 Gbps Ethernet 651, and an IP decoder 920 connected to the IP uncompressed video encoder 600 by the 1 Gbps Ethernet 652. The IP decoder 920 is connected to a coaxial cable 952 for outputting an HD-SDI uncompressed video signal 902, or an HDMI cable 953 for outputting an HDMI uncompressed video signal 903.

The uncompressed video transmission device 910 is a device that receives an HD-SDI uncompressed video signal 901 from the camera 930 via the cable 951, packetizes the video signal in conformance with the FEC scheme and packet format of SMPTE 2022-5/6, and transmits the packets over the 10 Gbps Ethernet 651. A device having this function has already been commercialized as of 2012, such as the MD8000 by Media Global Links (registered trademark), for example. The IP decoder 920 is a device that receives and decodes an IP packet stream conforming to the FEC scheme and packet format of SMPTE 2022.4/2 from the 1 Gbps Ethernet 652, and outputs the HD-SDI uncompressed video signal 902 or 903. Devices having this function have already been commercialized as of 2012, by multiple companies such as Tandberg (registered trademark), NEC (registered trademark), and Fujitsu (registered trademark).

In the video transmission system 900 of FIG. 9, the IP packet stream 601 of uncompressed video that has been IP packetized by the uncompressed video transmission device 910 is input into the IP uncompressed video encoder 600 via the 10 Gbps Ethernet 651, and converted into an IP packet stream 608 of compressed video. The IP packet stream 608 of compressed video is input from the IP uncompressed video encoder 600 into the IP decoder 920 via the 1 Gbps Ethernet 652. In the IP decoder 920, the IP packet stream of compressed video is decoded, and output as the HD-SDI uncompressed video signal 902 via the cable 952, or as the HDMI uncompressed video signal 903 via the cable 953.

Figure 10:
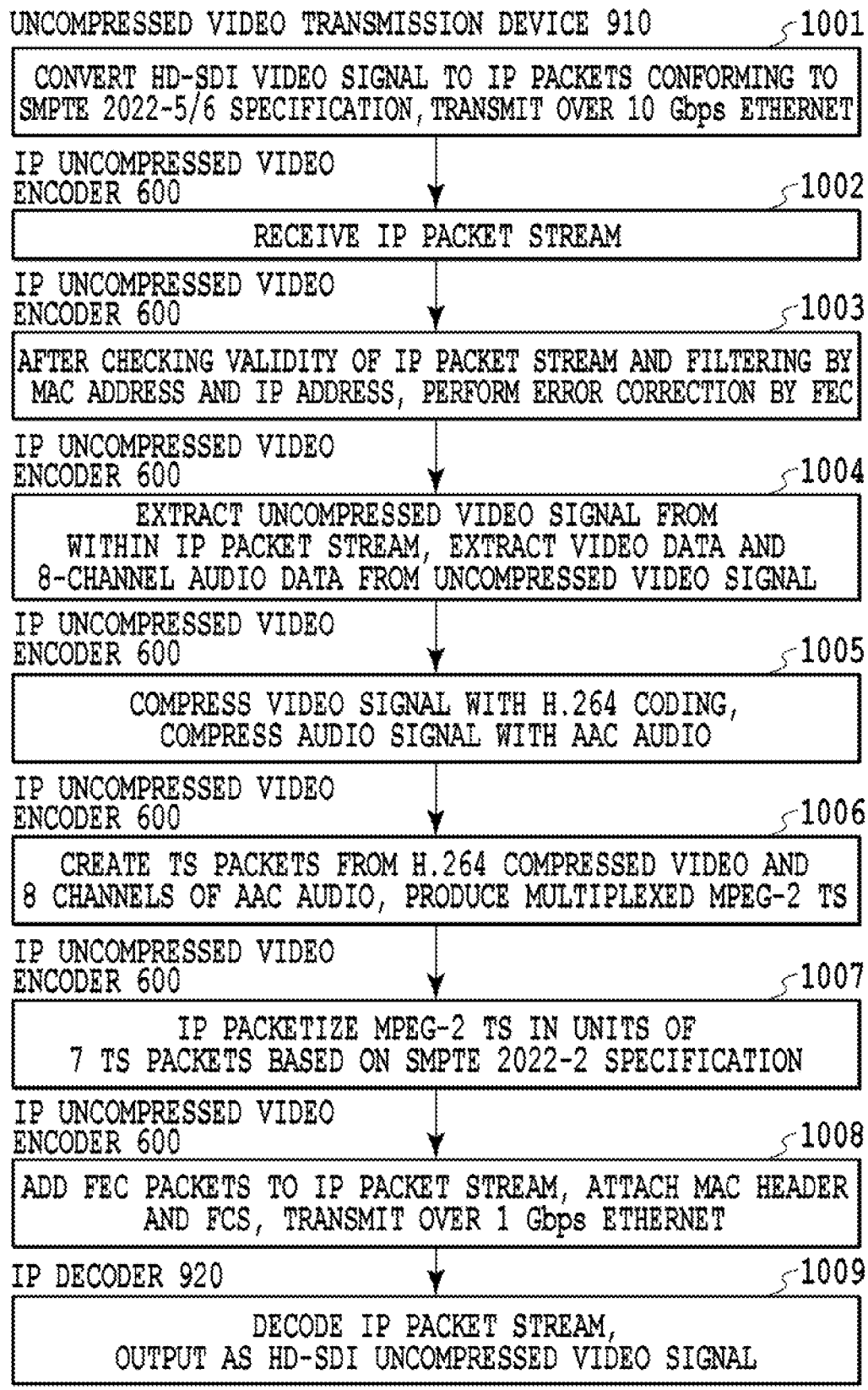
FIG. 10 is a flowchart from IP packetization of uncompressed video up to decoding an IP packet stream of compressed video and outputting to HD-SDI in the video transmission system of FIG. 9.

FIG. 10 is a flowchart illustrating the sequential flow from the IP packetization of uncompressed video up to decoding an IP packet stream of compressed video and outputting to HD-SDI in the video transmission system 900 of FIG. 9.

In step 1001, an HD-SDI video signal is IP packetized by the uncompressed video transmission device 910 using the FEC scheme and packet format conforming to the SMPTE 2022-5/6 specification, and the IP packet stream 601 is transmitted over the 10 Gbps Ethernet 651.

In step 1002, the IP packet stream 601 transmitted over the 10 Gbps Ethernet 651 is input into the IP input interface unit 610 of the IP uncompressed video encoder 600.

In step 1003, the IP packet stream 601 undergoes checks in the IP layer, the UDP layer, and the RTP layer by the IP input interface unit 610. An FEC process is conducted only on error-free IP packets for which the MAC address and the IP address match addresses required by the IP uncompressed video encoder 600, whereas lost packets are recovered by error correction. A packet group including packets recovered by error correction is sent to the signal extraction unit 621 of the encoder unit 620.

In step 1004, the signal extraction unit 621 inspects RTP sequence numbers in the IP packet stream, and for correct IP packets, removes the RTP, UDP, IP, and MAC headers, and forwards the resulting uncompressed video signal to the encoder control unit 622. The encoder control unit 622 extracts video data and 8-channel audio data from the uncompressed video signal from the signal extraction unit 621, and forwards the extracted data to the encoder 623.

In step 1005, the encoder 623 compresses the video signal retrieved by the encoder control unit 622 according to H.264 coding, and outputs a PES of H.264 compressed video. In addition, the encoder 623 compresses the 8-channel audio signal retrieved by the encoder control unit 622 according to AAC, and outputs PESs of 8 channels of AAC audio. Herein, the video compression technology is not limited to H.264, and the use of compression technology such as JPEG 2000, H.265, and VC-3 is also conceivable. Likewise, the audio compression technology is not limited to AAC, and the use of AC3, MPEG-2 Layer 1, and the like is also conceivable.

In step 1006, the MPEG-2 TS multiplexer 624 creates TS packets from the PES of H.264 compressed video and the PESs of 8 channels of AAC audio output from the encoder 623, and produces a multiplexed MPEG-2 TS.

In step 1007, the signal conversion unit 625 IP packetizes the MPEG-2. TS output from the multiplexer 624 on the basis of the SMPTE 2022-2 specification by inserting the MPEG-2 TS into RTP payloads in units of 7 TS packets, and adding an RTP header, a UDP header, and an IP header.

In step 1008, the IP output interface unit 630 performs FEC computations on the IP stream output from the signal conversion unit 625, and generates and adds FEC packets. Subsequently, a MAC header and an FCS are added to each IP packet, processing is conducted in the 1 Gbps Ethernet MAC sublayer to the each IP packet, and the IP packets are transmitted over the 1 Gbps Ethernet 652.

In step 1009, the IP packet stream 608 of compressed video output from the IP uncompressed video encoder 600 is decoded in the IP decoder 920, and output as an HD-SDI uncompressed video signal.

Figure 1:
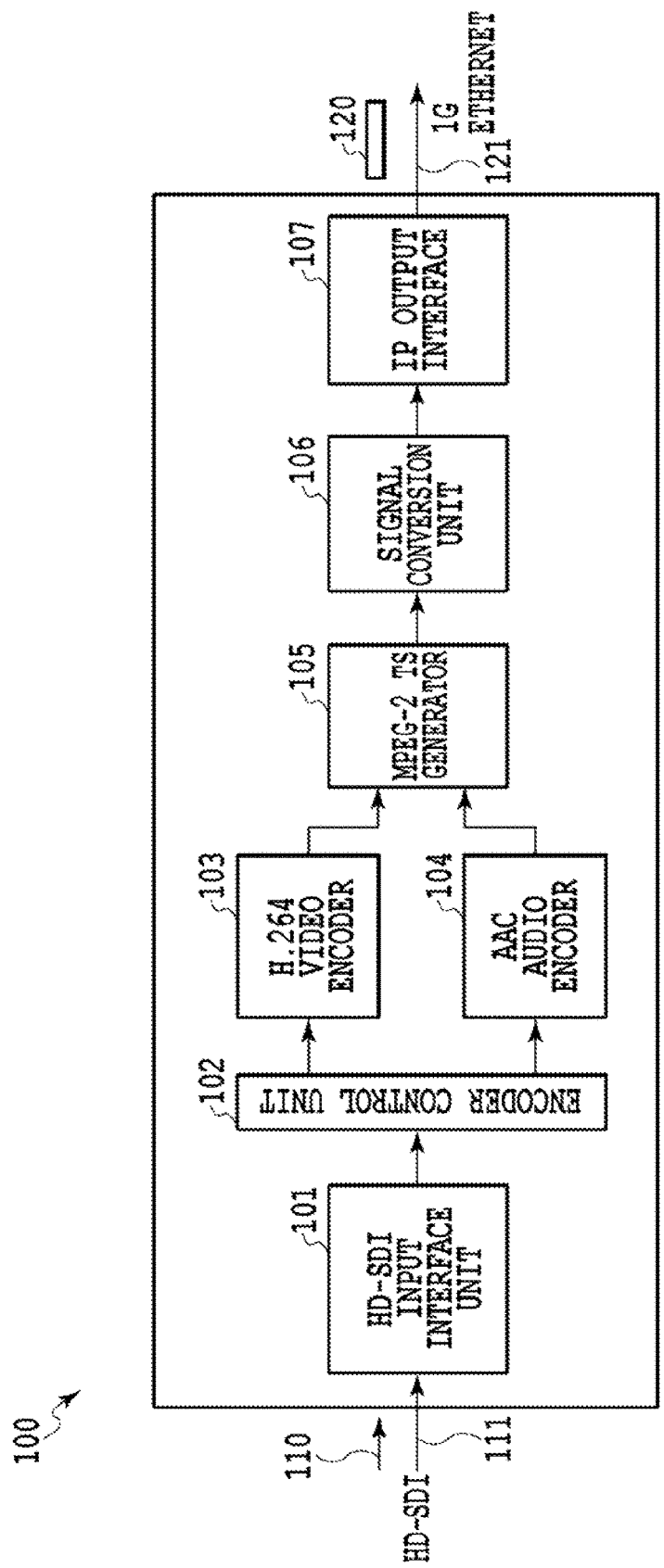
FIG. 1 is a configuration diagram illustrating a video encoder of the related art.
Figure 2:
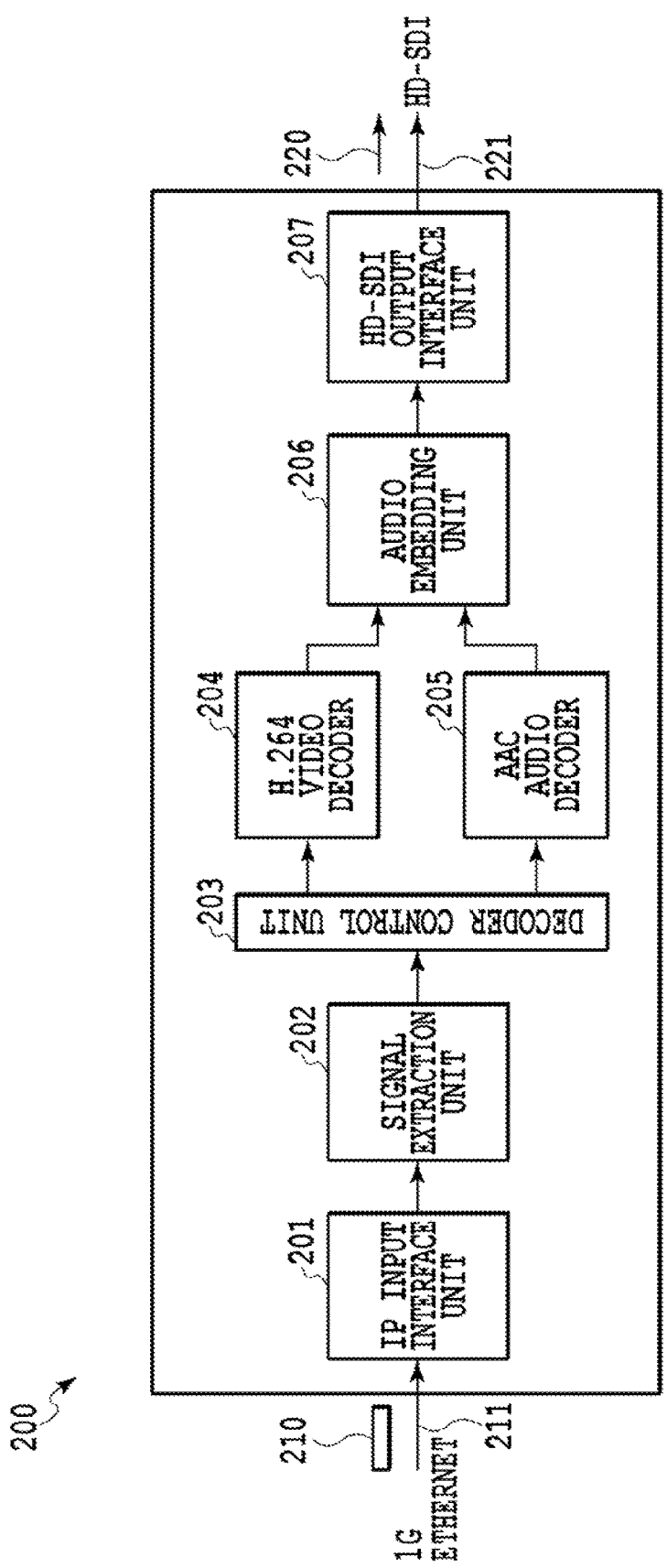
FIG. 2 is a configuration diagram illustrating a video decoder of the related art.
Figure 3:
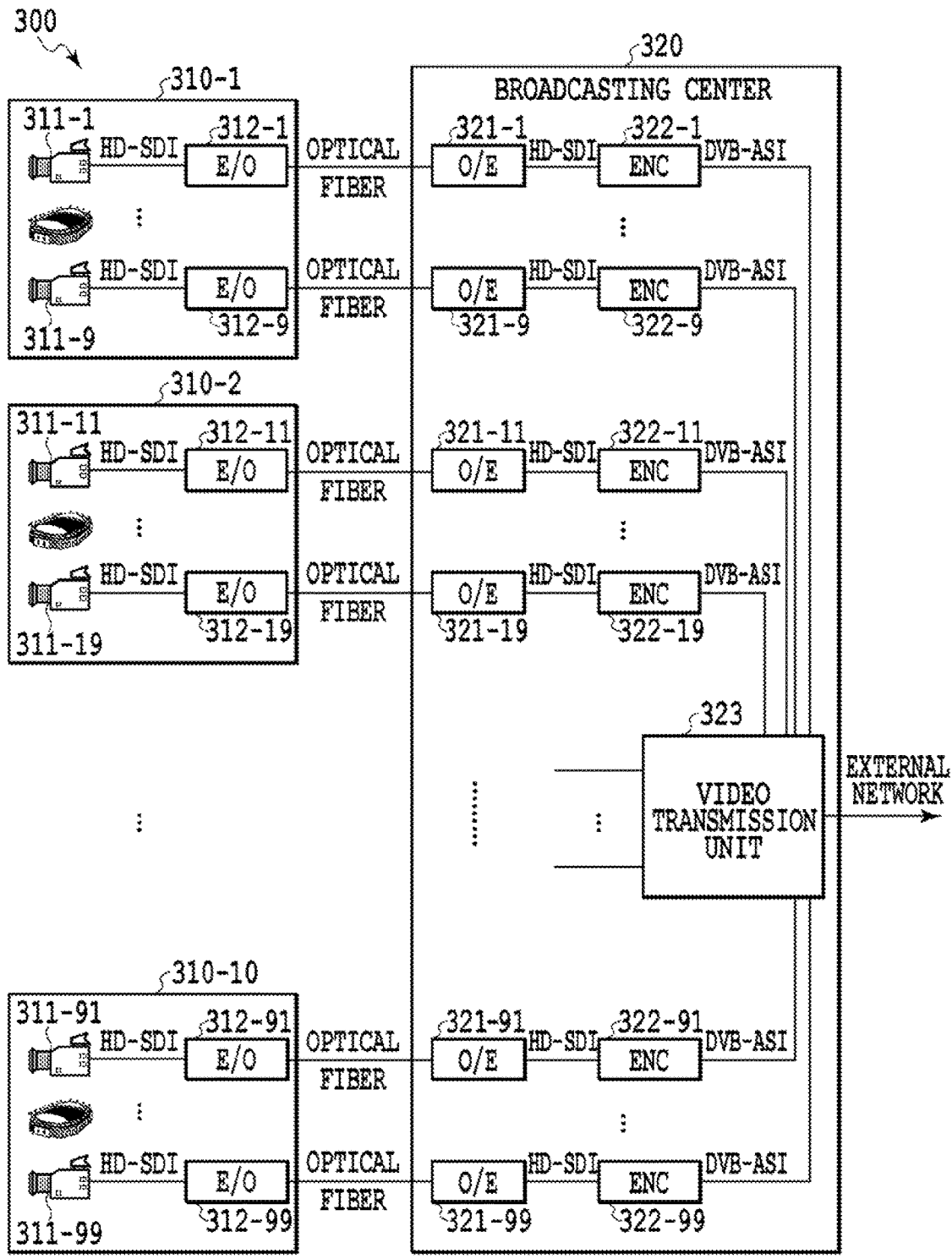
FIG. 3 is a configuration diagram illustrating a video delivery system of the related art.
Figure 4:
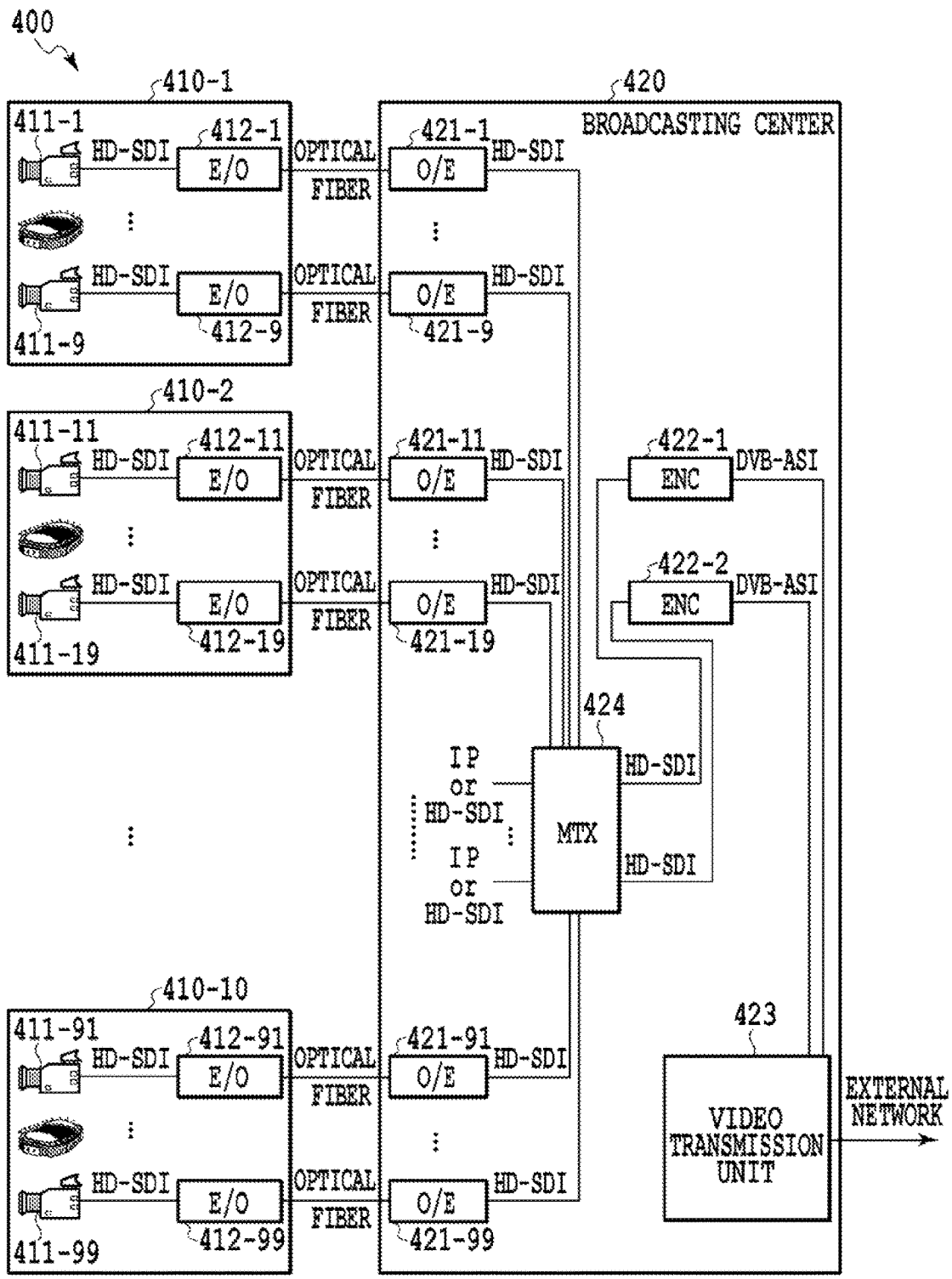
FIG. 4 is a configuration diagram illustrating a video delivery system of the related art.
Figure 11:
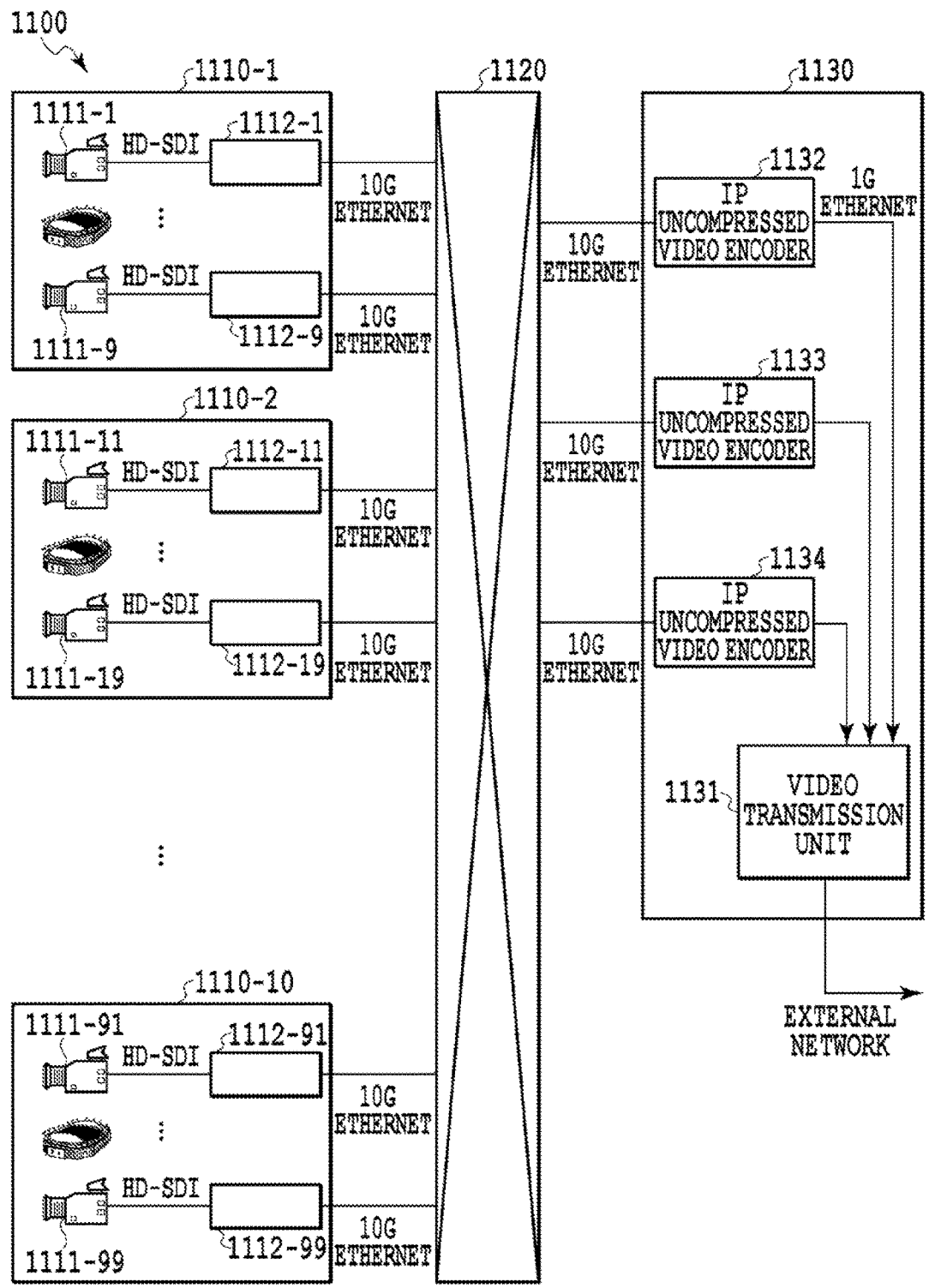
FIG. 11 is a configuration diagram of a video delivery system obtained by applying the IP uncompressed video encoder of FIG. 6 to a video delivery system of the related art.

FIG. 11 is a configuration diagram illustrating a video delivery system 1100 obtained by applying the IP uncompressed video encoder 600 illustrated in FIG. 6 to the video delivery system of the related art illustrated in FIG. 3 or FIG. 4.

In FIG. 11, uncompressed video transmission devices 1112-1 to 1112-99 are installed in correspondence with respective cameras in multiple stadiums (in FIG. 11, the stadiums 11104 to 1110-10 as an example), and uncompressed video from each camera in the stadiums is converted into an IP packet stream conforming to SMPTE 2022-5/6, and sent to an IP network 1120 via 10 Gbps Ethernet. A broadcasting center 1130 selects required IP packet streams from the IP network 1120, and inputs the selected IP packet streams into IP uncompressed video encoders 1132 to 1134. The IP packet stream group of compressed video output from the IP uncompressed video encoders 1132 to 1134 is input into a video transmission unit 1131 via a 1 Gbps Ethernet, and after video processing, is sent externally. Note that in the embodiment of FIG. 11, the numbers indicated in the present embodiment with respect to the number of video equipment such as cameras, the 10 Gbps Ethernet, and the 1 Gbps Ethernet are merely examples, and the present invention is not limited to these numbers.

In the system of FIG. 11, compared to the systems of FIGS. 3 and 4, an IP packetized uncompressed video signal may be transmitted directly to an IP uncompressed video encoder of the present invention, and an IP packet stream of compressed video may be generated. For this reason, by using an IP network as the transmission line and utilizing IP network routing and switching, it is possible to decrease the ratio of inactive equipment in a video delivery system, and without using a costly matrix switches, increase system flexibility and decrease costs for transmission line construction and the laying of cable.

Another advantage obtained by using an IP uncompressed video encoder of the present invention is that by shifting the constraints on the system that had been imposed by using 1-to-1 coaxial cables of the related art to an Ethernet base with respect to video compression, it becomes possible construct a completely new form of broadcasting network.

Second Embodiment

Figure 12:
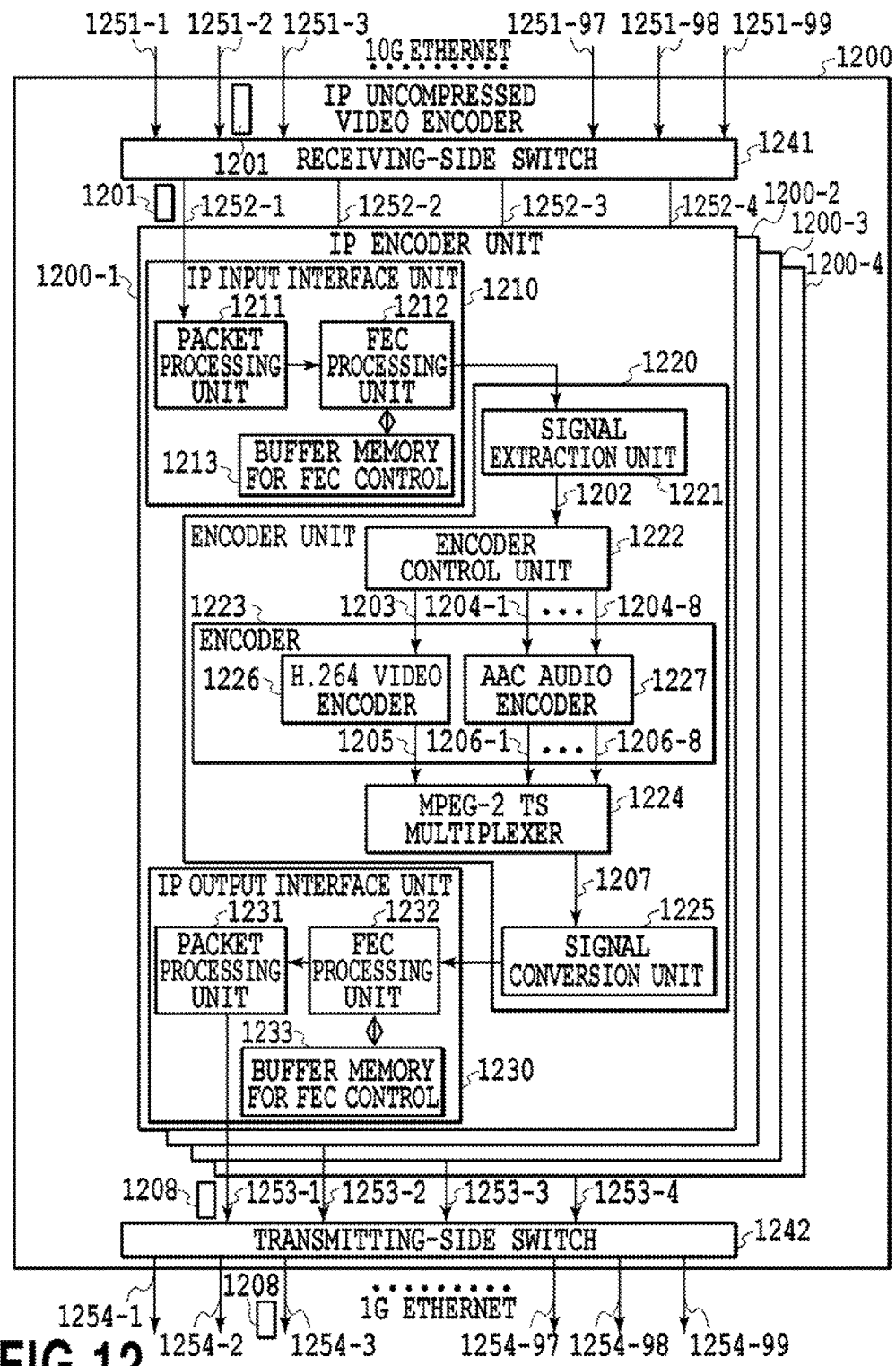
FIG. 12 is a configuration diagram illustrating an IP uncompressed video encoder according to a second embodiment of the present invention.

FIG. 12 is a configuration diagram illustrating an IP uncompressed video encoder according to a second embodiment of the present invention. The IP uncompressed video encoder 1200 illustrated in FIG. 12 adds a switching function that selects the pathway of an IP stream to the IP uncompressed video encoder 600 of the first embodiment illustrated in FIG. 6. The IP uncompressed video encoder 1200 receives IP packet streams of uncompressed video in a packet format and FEC scheme conforming to SMPTE 2022-5/6 from 10 Gbps Ethernets 1251-1 to 1251-99, and selects four IP packet streams. Subsequently, video data and audio data is retrieved from the selected four IP packet streams, and compressed to create IP packet streams of compressed video conforming to SMPTE 2022-1/2. After that, the created IP packet streams of compressed video are transmitted over networks selected from among 1 Gbps Ethernets 1254-1 to 1254-99.

The IP uncompressed video encoder 1200 illustrated in FIG. 12 includes four IP encoder units 1200-1 to 1200-4, as well as a receiving-side switch 1241 and a transmitting-side switch 1242 that select the pathway of an IP stream. Each switch of the receiving-side switch 1241 and the transmitting-side switch 1242 fulfills the role of a switch or router that selects the pathway of an IP stream, and selects a pathway by MAC address or IP address, for example.

Switching or routing is conducted in Layer 2 or Layer 3 of the Open Systems Interconnection (OSI) reference model. The receiving-side switch 1241 has 10 Gbps Ethernets 1251-1 to 1251-99 as inputs, and has interfaces 1252-1 to 1252-4 to the IP encoder units as outputs. Between the inputs and the outputs, the receiving-side switch 1241 conducts packet switching in the MAC sublayer or the IP layer. Specifically, the receiving-side switch 1241 selects the interfaces 1252-1 to 1252-4 to the IP encoder units according to the MAC address, ULAN, or IP address of an IP stream to be encoded in an IP uncompressed video encoder. Subsequently, the IP stream to be encoded is forwarded to the selected interface, and input into an IP encoder unit.

The IP encoder unit 1200-1 includes an IP input interface unit 1210 that receives an IP packet stream of uncompressed video, an encoder unit 1220 that compresses and encodes the received IP packet stream of uncompressed video, and an IP output interface unit 1230 that outputs the compressed IP packet stream. Note that the IP encoder units 1200-2 to 1200-4 have a similar configuration to the IP encoder unit 1200-1.

The IP input interface unit 1210 includes a 10G Ethernet packet processing unit 1211, an ITC processing unit 1212, and buffer memory 1213 for FEC control.

The packet processing unit 1211 inspects an IP packet stream 1201 input from the interface 1252-1 in the MAC layer, the IP layer, the UDP layer, and the RTP layer, and forwards to the FEC processing unit 1212 only IP packets for which the MAC address and the IP address match the addresses of the IP stream to be encoded, and for which the FCS inspection, packet length inspection, and checksum inspection results are correct.

The FEC processing unit 1212 writes IP packets from the packet processing unit 1211 into the buffer memory 1213 for FEC control, and also controls the FEC matrix as the receiving side. If the FEC processing unit 1212 judges that the IP packets needed to construct a designated FEC matrix have all been written to the buffer memory 1213, the FEC processing unit 1212 reads out data for the relevant FEC matrix from the buffer memory 1213, and by performing FEC computations, reconstructs lost packets and conducts an error correction process. The error-corrected IP packets are sent by the FEC processing unit 1212 to the encoder unit 1220.

The encoder unit 1220 includes a signal extraction unit 1221 that retrieves an uncompressed video signal from IP packets input into the IP uncompressed video encoder, an encoder control unit 1222 that receives the retrieved uncompressed video signal, and outputs video data and audio data, an encoder 1223 that compresses and encodes the retrieved video data and audio data, an MPEG-2 TS multiplexer 1224, and a signal conversion unit 1225 that IP packetizes the compressed video signal.

The signal extraction unit 1221 inspects RTP sequence numbers in the IP packet stream from the FEC processing unit 1212 of the IP input interface unit 1210, and for correct IP packets, removes the RTP, UDP, IP, and MAC headers, and extracts and forwards an uncompressed video signal 1202 to the encoder control unit 1222.

The encoder control unit 1222 extracts video data 1203 and audio data 1204-1 to 1204-8 from the uncompressed video signal 1202 input from the signal extraction unit 1221, and forwards the extracted data to the encoder 1223.

The encoder 1223 includes a video encoder 1226 that compresses uncompressed video data according to H.264 coding, and an audio encoder 1227 that compresses 8 channels of audio data into AAC audio.

The video encoder 1226 accepts the video data 1203 from the encoder control unit 1222, and outputs a PES 1205 of H.264 compressed video. The audio encoder 1227 receives the audio data 1204-1 to 1204-8 from the encoder control unit 1222, and outputs PESs 1206-1 to 1206-8 of compressed audio compressed with AAC.

The MPEG-2 TS multiplexer 1224 receives the compressed video PES 1205 from the video encoder 1226 and the compressed audio PESs 1206-1 to 1206-8 from the audio encoder 1227, creates TS packets, and produces a multiplexed MPEG-2 TS 1207.

The signal conversion unit 1225 IP packetizes the MPEG-2 TS 1207 on the basis of the SMPTE 2022-2 specification by inserting the MPEG-2 TS 1207 into RTP payloads in units of 7 TS packets, and adding an RTP header, a UDP header, and an IP header.

The IP output interface unit 1230 includes an FEC processing unit 1232, buffer memory 1233 for FEC control, and a 1 Gps Ethernet packet processing unit 1231. The FEC processing unit 1232 writes IP packets from the signal conversion unit 1225 into the buffer memory 1233 for FEC control, and also controls the FEC matrix as the transmitting side. If the FEC processing unit 1232 judges that the IP packets needed to construct a designated FEC matrix have all been written to the buffer memory 1233, the FEC processing unit 1232 reads out data for the relevant FEC matrix from the buffer memory 1233, and by performing FEC computations, generates FEC packets. The FEC packets, as well as the IP packets from the signal conversion unit 1225, are sent from the FEC processing unit 1232 to the packet processing unit 1231 in a designated order prescribed by SMPTE 2022-1.

The packet processing unit 1231 attaches the MAC header and the FCS to the IP packets from the FEC processing unit 1232, performs processing in the 1 Gbps Ethernet MAC sublayer, and forwards the IP packets as an IP packet stream 1208 to the transmitting-side switch 1242 via an interface 1253-1.

The transmitting-side switch 1242 has interfaces 1253-1 to 1253-4 from each of the IP encoder units 1200-1 to 1200-4 as inputs, and has 1 Gbps Ethernets 1254-1 to 1254-99 as outputs. Between these inputs and outputs, the transmitting-side switch 1242 conducts packet switching in the MAC sublayer or the IP layer. Specifically, the transmitting-side switch 1242 uses the MAC address, VLAN, or IP address to forward the IP packet stream 1208 to a 1 Gbps Ethernet for output from among 1254-1 to 1254-99. It is possible to transmit the IP packet stream of compressed video that was encoded to an arbitrary network connected to the transmitting-side switch.

Note that in the present embodiment, the receiving-side switch 1241 selects four packet streams, but this is merely one example, and in the present invention, the packet streams selected by the receiving-side switch 1241 are not limited to four. Similarly, the IP encoder units are also not limited to four. Furthermore, the 10 Gbps Ethernet and the 1 Gbps Ethernet are likewise not limited to the numbers described in the present example. This applies similarly to FIG. 13 and thereafter.

Figure 13:
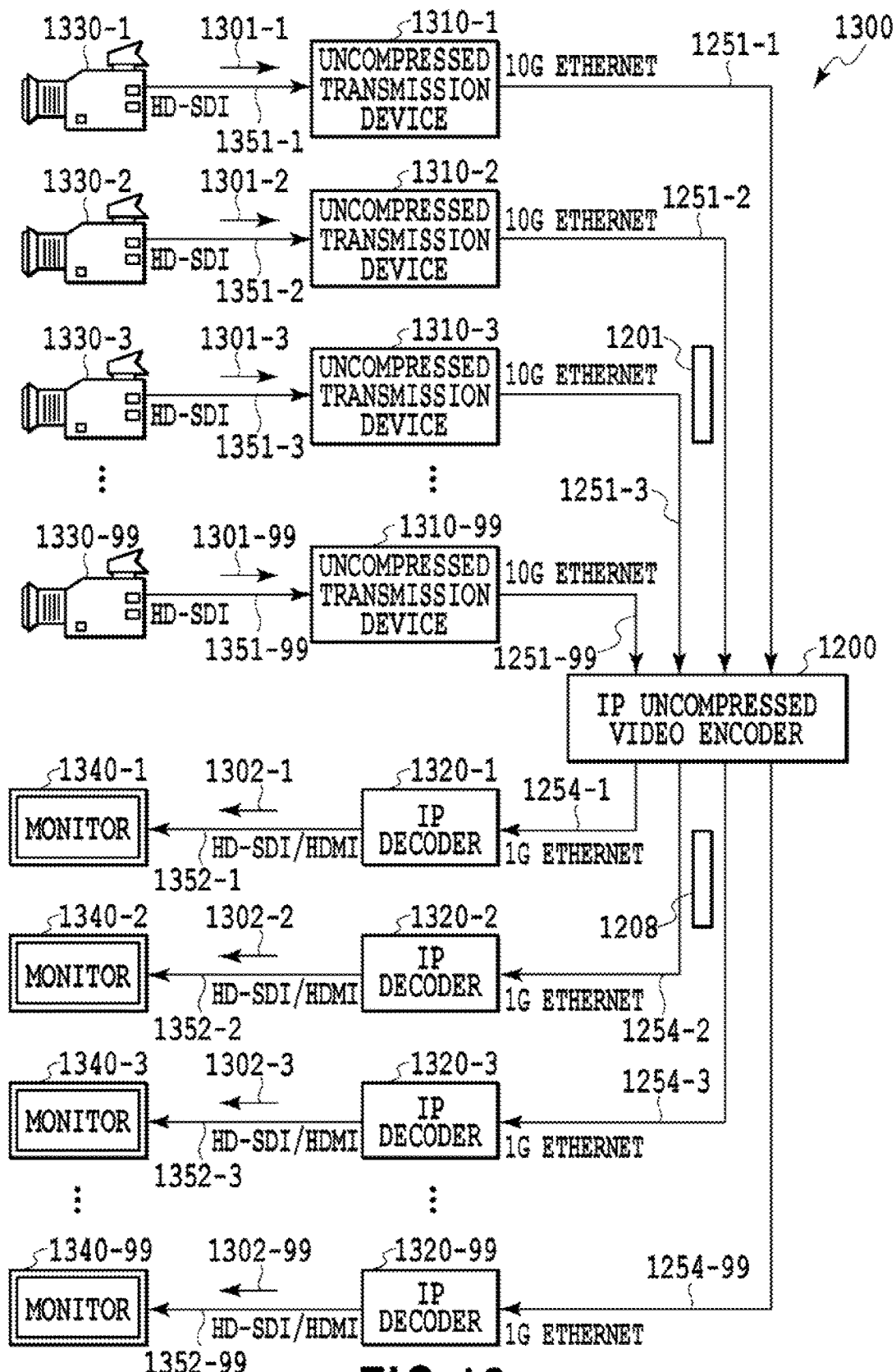
FIG. 13 is a configuration diagram of a video transmission system using the IP uncompressed video encoder of FIG. 12.

FIG. 13 is a configuration diagram illustrating a video transmission system 1300, which is a video transmission system using the IP uncompressed video encoder 1200 illustrated in FIG. 6. The video transmission system 1300 includes cameras 1330-1 to 1330-99, uncompressed video transmission devices 1310-1 to 1310-99 respectively connected to the cameras 1330-1 to 1330-99 by HD-SDI coaxial cables 1351-1 to 1351-99, the IP uncompressed video encoder 1200 connected to the uncompressed video transmission devices 1310-1 to 1310-99 by 10 Gbps Ethernets 1251-1 to 1251-99, IP decoders 1320-1 to 1320-99 connected to the IP uncompressed video encoder 1200 by 1G Ethernets 1254-1 to 1254-99, and monitors 1340-1 to 1340-99 respectively connected to the IP decoders 1320-1 to 1320-99 by HD-SDI coaxial cables or HDMI cables 1352-1 to 1352-99.

The video transmission system 1300 is a system for viewing arbitrary video shot by one camera among the cameras 1330-1 to 1330-99 on an arbitrary monitor among the monitors 1340-1 to 1340-99, and is able to forward the video from all cameras to all monitors.

The uncompressed video transmission devices 1310-1 to 1310-99 are devices that respectively receive HD-SDI uncompressed video signals 1301-1 to 1301-99 transmitted from the cameras 1330-1 to 1330-99 via the coaxial cables 1351-1 to 1351-99, packetize the video signals in conformance with the FEC scheme and packet format of SMPTE 2022-5/6, and transmit the packets over the 10 Gbps Ethernets 1251-1 to 1251-99. The IP decoders 1320-1 to 1320-99 are devices that respectively receive and decode IP packet streams conforming to the FEC scheme and packet format of SMPTE 2022-1/2 from the 1G Ethernets 1254-1 to 1254-99, and output the HD-SDI or HDMI uncompressed video signals 1302-1 to 1302-99 via the coaxial cables or HDMI cables 1352-1 to 1352-99.

In the video transmission system 1300 of FIG. 13, for example, an IP packet stream 1201 of uncompressed video that has been IP packetized by the uncompressed video transmission device 1310-2 is input into the IP uncompressed video encoder 1200 via the 10 Gbps Ethernet 1251-2, and converted into an IP packet stream 1208 of compressed video. The IP packet stream 1208 of compressed video is input from the IP uncompressed video encoder 1200 into the IP decoder 1320-3 via the 1 Gbps Ethernet 1254-3 selected by the transmitting-side switch 1242. In the IP decoder 1320-3, the IP packet stream of compressed video is decoded, output as an HD-SDI or HDMI uncompressed video signal 1302-3 via the coaxial cable or HDMI cable 1352-3, and displayed on the monitor 1340-3.

Figure 14:
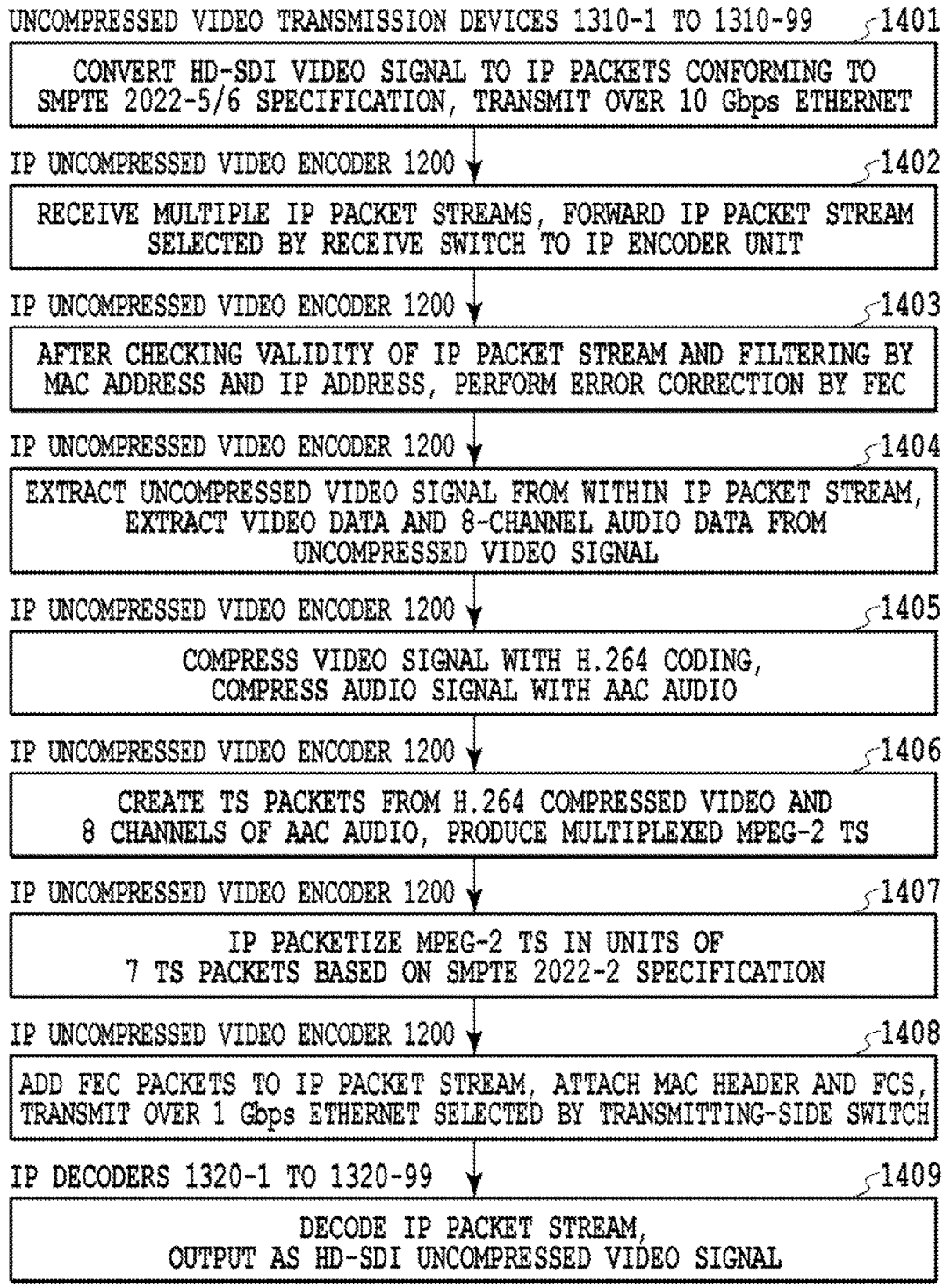
FIG. 14 is a flowchart from IP packetization of uncompressed video up to decoding an IP packet stream of compressed video and outputting to HD-SDI in the video transmission system of FIG. 13.

FIG. 14 is a flowchart illustrating the sequential flow from the IP packetization of uncompressed video up to decoding an IP packet stream of compressed video and outputting to HD-SDI in the video transmission system 1300 of FIG. 13.

In step 1401, an HD-SDI video signal from the camera 1330-2 is, for example, IP packetized by the uncompressed video transmission device 1310-2 using the FEC scheme and packet format conforming to the SMPTE 2022-5/6 specification, and the IP packet stream 1201 is transmitted over a 10 Gbps Ethernet.

In step 1402, the IP packet stream 1201 transmitted over the 10 Gbps Ethernet 1251-2 is input into the receiving-side switch 1241 of the IP uncompressed video encoder 1200. If the IP encoder unit 1200-1 is selected as the pathway by the receiving-side switch 1241, the IP packet stream 1201 is forwarded from the receiving-side switch interface 1252-1 to the IP input interface unit 1210.

In step 1403, the IP packet stream 1201 undergoes checks in the IP layer, the UDP layer, and the RTP layer by the IP input interface unit 1210. An FEC process is conducted only on error-free IP packets for which the MAC address and the IP address match addresses required by the IP uncompressed video encoder 1200, whereas lost packets are recovered by error correction. A packet group including packets recovered by error correction is sent to the signal extraction unit 1221 of the encoder unit 1220.

In step 1404, the signal extraction unit 1221 inspects RTP sequence numbers in the IP packet stream, and for correct IP packets, removes the RTP, UDP, IP, and MAC headers, and forwards the resulting uncompressed video signal to the encoder control unit 1222. The encoder control unit 1222 extracts video data and 8-channel audio data from the uncompressed video signal from the signal extraction unit 1221, and forwards the extracted data to the encoder 1223.

In step 1405, the encoder 1223 compresses the video signal retrieved by the encoder control unit 1222 according to H.264 coding, and outputs a PES of H.264 compressed video. In addition, the encoder 1223 compresses the 8-channel audio signal retrieved by the encoder control unit 1222 according to AAC, and outputs PESs of 8 channels of AAC audio.

In step 1406, the MPEG-2 TS multiplexer 1224 creates TS packets from the PES of H.264 compressed video and the PESs of 8 channels of AAC audio output from the encoder 1223, and produces a multiplexed MPEG-2 TS.

In step 1407, the signal conversion unit 1225 IP packetizes the MPEG-2. TS output from the multiplexer 1224 on the basis of the SMPTE 2022-2 specification by inserting the MPEG-2 TS into RTP payloads in units of 7 TS packets, and adding an RTP header, a UDP header, and an IP header.

In step 1408, the IP output interface unit 1230 performs FEC computations on the IF stream output from the signal conversion unit 1225, and generates and adds FEC packets. Subsequently, a MAC header and an FCS are added to each IP packet, processing is conducted in the 1 Gbps Ethernet MAC sublayer, and the IP packets are forward to the transmitting-side switch interface 1253-1 as the IP packet stream 1208. The transmitting-side switch selects the 1 Gbps Ethernet 1254-3, for example, and forwards the IP packet stream 1208.

In step 1409, the IP packet stream 1208 of compressed video output from the IP uncompressed video encoder 1200 is decoded by the IP decoder 1320-3, output over the coaxial cable 1352-3 as an HD-SDI uncompressed video signal 1302-3, and displayed on the monitor 1340-3.

The above description regarding FIGS. 12, 13, and 14 is based on a configuration having both a receiving-side switch and a transmitting-side switch, but depending on the configuration of the network applying the present invention, application is also possible in which the network interface and the receiving means are joined directly without a receiving-side switch, or in which the transmitting means and the network interface are joined directly without a transmitting-side switch.

Additionally, in the case of performing a specific implementation of the present invention, using an Ethernet switch supporting Layer 2 or Layer 3 enables the receiving-side switch and the transmitting-side switch to be realized by using the same single switch.

Figure 15:
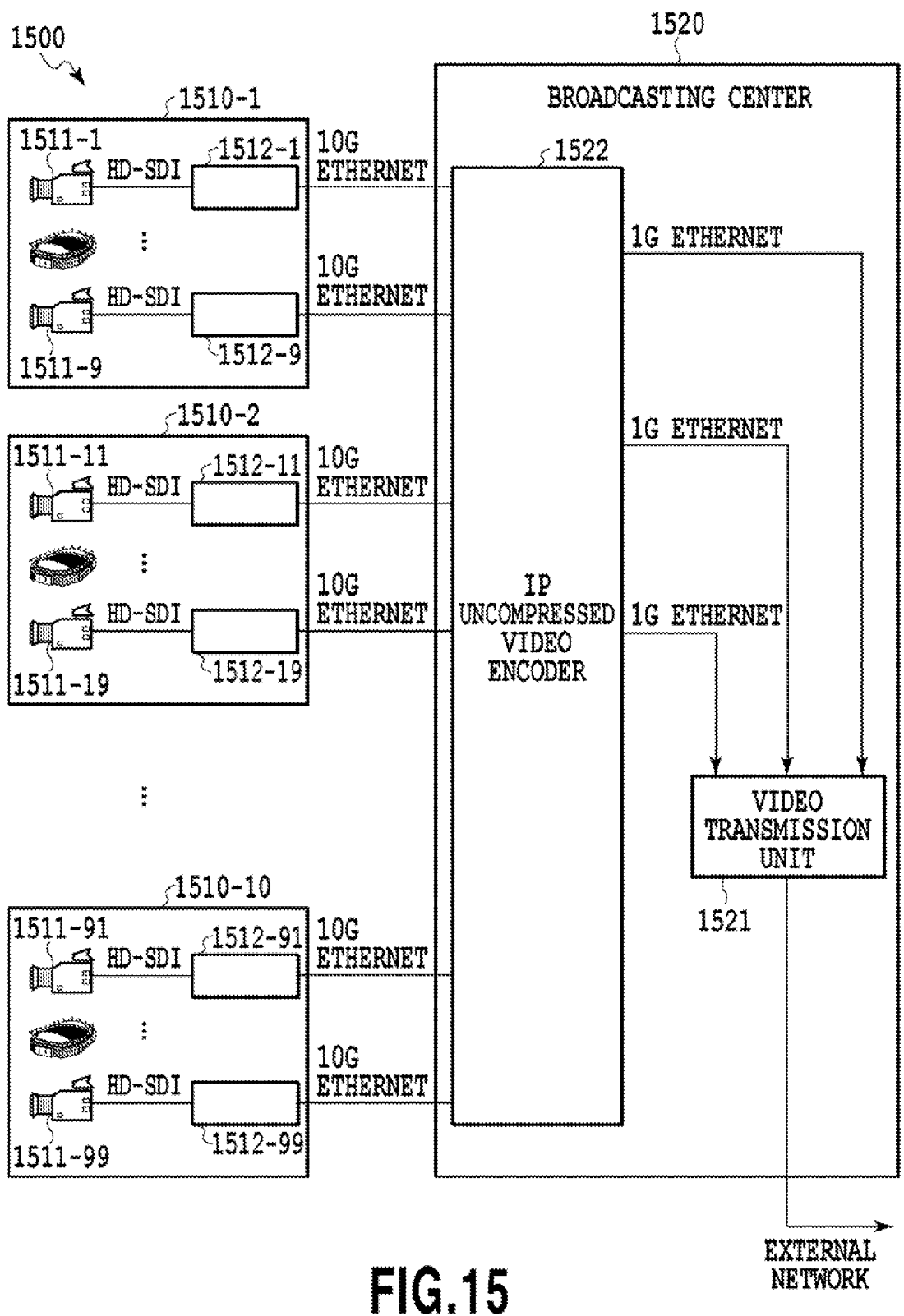
FIG. 15 is a configuration diagram of a video delivery system obtained by applying the IP uncompressed video encoder of FIG. 12 to a video delivery system of the related art.

FIG. 15 is a configuration diagram illustrating a video delivery system 1500 obtained by applying the IP uncompressed video encoder 1200 illustrated in FIG. 12 to the video delivery system of the related art illustrated in FIG. 3 or FIG. 4.

In FIG. 15, uncompressed video transmission devices 1512-1 to 1512-99 are installed in correspondence with respective cameras in multiple stadiums 1510-1 to 1510-10, and uncompressed video from each camera in the stadiums is converted into an IP packet stream conforming to SMPTE 2022-5/6, and input into the IP uncompressed video encoder 1522 via 10 Gbps Ethernet. In the IP uncompressed video encoder 1522, video data and audio data are retrieved from the input IP packet streams, and compressed to create IP packet streams of compressed video conforming to SMPTE 2022-1/2, and transmitted over 1 Gbps Ethernet connected to a video transmission unit 1521 using a receiving-side switch or a transmitting-side switch. After video processing, the IP packet streams of compressed video input into the video transmission unit 1521 are sent to an external network.

In the system of FIG. 15, the streams of IP packetized uncompressed video signals are transmitted directly to the IP uncompressed video encoder of the present invention, and the IP packet streams to be compressed may be selected by a receiving-side switch, while in addition, the transmission destination of the created IP packet streams of compressed video may be selected by a transmitting-side switch. Consequently, compared to the systems of FIG. 3 and FIG. 4, it is possible to decrease the ratio of inactive equipment, and without using a costly matrix switcher, increase system flexibility and decrease costs for transmission line construction and the laying of cable.

Third Embodiment

Figure 16:
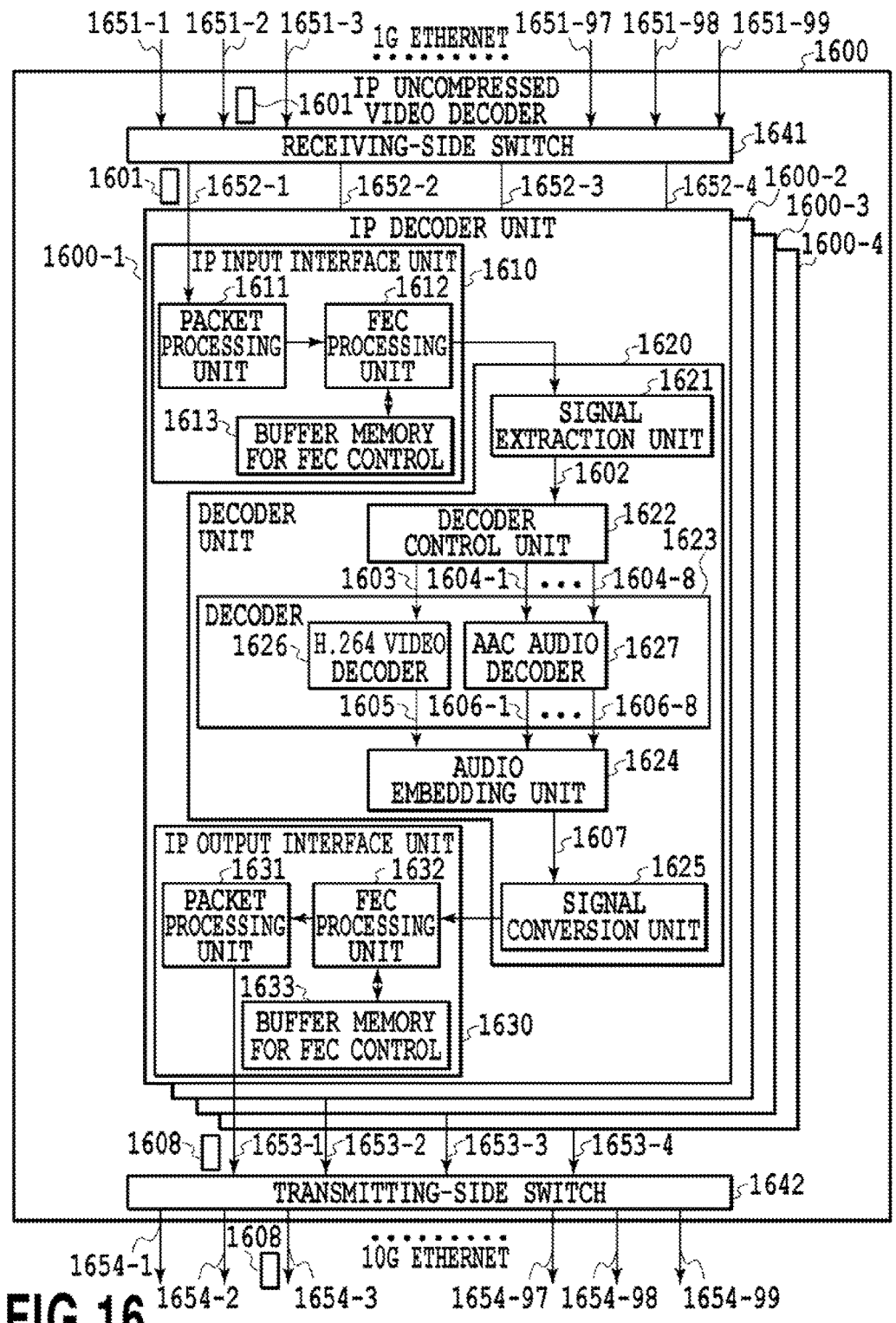
FIG. 16 is a configuration diagram illustrating an IP uncompressed video decoder according to a third embodiment of the present invention.

FIG. 16 is a configuration diagram illustrating an IP uncompressed video decoder according to a third embodiment of the present invention. The IP uncompressed video decoder 1600 illustrated in FIG. 16 receives IP packet streams of uncompressed video in a packet format and FEC scheme conforming to SMPTE 2022-1/2 from 1 Gbps Ethernets 1651-1 to 1651-99, and selects four IP packet streams. Subsequently, video data and audio data is retrieved from the selected four IP packet streams, and decoded to create IP packet streams of uncompressed video signals conforming to SMPTE 2022-516. After that, the created IP packet streams of uncompressed video are transmitted over networks selected from among 10 Gbps Ethernets 1654-1 to 1654-99.

The IP uncompressed video decoder 1600 illustrated in FIG. 16 includes four IP units 1600-1 to 1600-4, a receiving-side switch 1641, and a transmitting-side switch 1642.

Each switch of the receiving-side switch 1641 and the transmitting-side switch 1642 fulfills the role of a switch or router that selects the pathway of an IP stream, and selects a pathway by MAC address or IP address, for example. Switching or routing is conducted in Layer 2 or Layer 3 of the OSI reference model. The receiving-side switch 1641 has 1. Gbps Ethernets 1651-1 to 1651-99 as inputs, and has interfaces 1652-1 to 1652-4 to the IP decoder units as outputs. Between the inputs and the outputs, the receiving-side switch 1641 conducts packet switching in the MAC sublayer or the IP layer. Specifically, the receiving-side switch 1641 selects the interfaces 1652-1 to 1652-4 to the IP decoder units according to the MAC address, VLAN, or IP address of an IP stream to be decoded in an IP uncompressed video decoder. After that, the IP stream to be decoded is forwarded to the selected interface, and input into the IP decoder unit.

The IP decoder unit 1600-1 includes an IP input interface unit 1610 that receives a compressed IP packet stream, an decoder unit 1620 that decodes the received IP packet stream of compressed video, and an IP output interface unit 1630 that outputs an IP packet stream of uncompressed video.

The IP input interface unit 1610 includes a 1G Ethernet packet processing unit 1611, an FEC processing unit 1612, and buffer memory 1613 for FEC control. Note that the IP decoder units 1600-2 to 1600-4 have a similar configuration to the IP decoder unit 1600-1.

The packet processing unit 1611 inspects an IP packet stream 1601 input from the interface 1652-1 in the MAC layer, the IP layer, the UDP layer, and the RTP layer, and forwards to the FEC processing unit 1612 only IP packets for which the MAC address and the IP address match the addresses of the IP stream to be decoded, and for which the FCS inspection, packet length inspection, and checksum inspection results are correct.

The FEC processing unit 1612 writes IP packets from the packet processing unit 1611 into the buffer memory 1613 tier FEC control, and also controls the FEC matrix as the receiving side. If the FEC processing unit 1612 judges that the IP packets needed to construct a designated FEC matrix have all been written to the buffer memory 1613, the FEC processing unit 1612 reads out data for the relevant FEC matrix from the buffer memory 1613, and by performing FEC computations, reconstructs lost packets and conducts an error correction process. The error-corrected IP packets are sent by the FEC processing unit 1612 to the decoder unit 1620.

The decoder unit 1620 includes a signal extraction unit 1621 that retrieves an MPEG-2 TS from the IP packets input into the IP uncompressed video decoder, a decoder control unit 1622 that receives the retrieved MPEG-2 TS, and outputs video data and audio data, a decoder 1623 that decodes the retrieved video data and audio data, an audio embedding unit 1624 that embeds the decoded audio data into the decoded uncompressed video signal, and a signal conversion unit 1625 that IP packetizes the uncompressed video signal output from the audio embedding unit 1624.

The signal extraction unit 1621 inspects RTP sequence numbers in the IP packet stream from the FEC processing unit 1612 of the IP input interface unit 1610, and for correct IF packets, removes the RTP, EP, and MAC headers, and extracts and forwards an MPEG-2 TS 1602 to the decoder control unit 1622.

The decoder control unit 1622 extracts compressed video data 1603 and compressed audio data 1604-1 to 1604-8 from the MPEG-2 TS 1602 input from the signal extraction unit 1621, and forwards the extracted data to the decoder 1623. For the extraction of video data and audio data from the MPEG-2 TS 1602, extraction is conducted by extracting data from designated fields on the basis of the ISO/IEC 13818-1 standard. Regarding the audio data, 8 channels are decoded in the present example.

The decoder 1623 includes a video decoder 1626 that decodes compressed video that has been compressed according to H.264 coding, and an audio decoder 1627 that decodes 8 channels of audio data that has been compressed according to AAC.

The video decoder 1626 receives the video data 1603 from the decoder control unit 1622, performs H264 decoding on the video data 1603, and outputs an uncompressed video signal 1605. The audio decoder 1627 receives audio data 1604-1 to 1604-8 from the decoder control unit 1622, and outputs decoded audio data 1606-1 to 1606-8.

The uncompressed video signal 1605 from the video decoder 1626 and the audio data 1606-1 to 1606-8 from the audio decoder 1627 are input into the audio embedding unit 1624. The audio embedding unit 1624 embeds the audio data 1606-1 to 1606-8 into the uncompressed video signal 1605, and produces an uncompressed video signal 1607 with embedded audio. The embedding of audio data into the 3G-SDI, HD-SDI, or SD-SDI uncompressed video signal 1605 is conducted on the basis of the SMPTE 424M, 292M, or 259M standard, respectively.

The signal conversion unit 1625 IP packetizes the uncompressed video signal 1607 on the basis of the SMPTE 2022-6 specification by dividing the uncompressed video signal 1607 into units of fixed lengths, and adding an RTP header, a UDP header, and an IP header.

The IP output interface unit 1630 includes an FEC processing unit 1632, buffer memory 1633 for FEC control, and a 10 Gbps Ethernet packet processing unit 1631. The FEC processing unit 1632 writes IP packets from the signal conversion unit 1625 into the buffer memory 1633 for FEC control, and also controls the FEC matrix as the transmitting side. If the FEC processing unit 1632 judges that the IP packets needed to construct a designated FEC matrix have all been written to the buffer memory 1633, the FEC processing unit 1632 reads out data for the relevant FEC matrix from the buffer memory 1633, and by performing FEC computations, generates FEC packets. The FEC packets, as well as the IP packets from the signal conversion unit 1625, are sent from the FEC processing unit 1632 to the packet processing unit 1631 in a designated order prescribed by SMPTE 2022-5.

The packet processing unit 1631 attaches the MAC header and the KS to the IP packets from the FEC processing unit 1632, performs processing in the 10 Gbps Ethernet MAC sublayer, and forwards the IP packets as an IP packet stream 1608 to the transmitting-side switch 1642 via the interface 1653-1.

The transmitting-side switch 1642 has interfaces 1653-1 to 1653-4 with each of the IP decoder units 1600-1 to 1600-4 as inputs, and has 10 Gbps Ethernets 1654-1 to 1654-99 as outputs. Between these inputs and outputs, the transmitting-side switch 1642 conducts packet switching in the MAC sublayer or the IP layer. Specifically, the transmitting-side switch 1642 uses the MAC address, VLAN, or IP address to forward the IP packet stream 1608 to a 10 Gbps Ethernet for output from among 1654-1 to 1654-99. It is possible to transmit the IP packet stream of uncompressed video that was decoded to an arbitrary network connected to the transmitting-side switch.

Note that in the present embodiment, the receiving-side switch 1641 selects four packet streams, but this is merely one example, and in the present invention, the packet streams selected by the receiving-side switch 1641 are not limited to four. Similarly, the IP decoder units are also not limited to four. Furthermore, the 10 Gbps Ethernet and the 1 Gbps Ethernet are likewise not limited to the numbers described in the present embodiment. This applies similarly to FIGS. 17 to 19.

Figure 17:
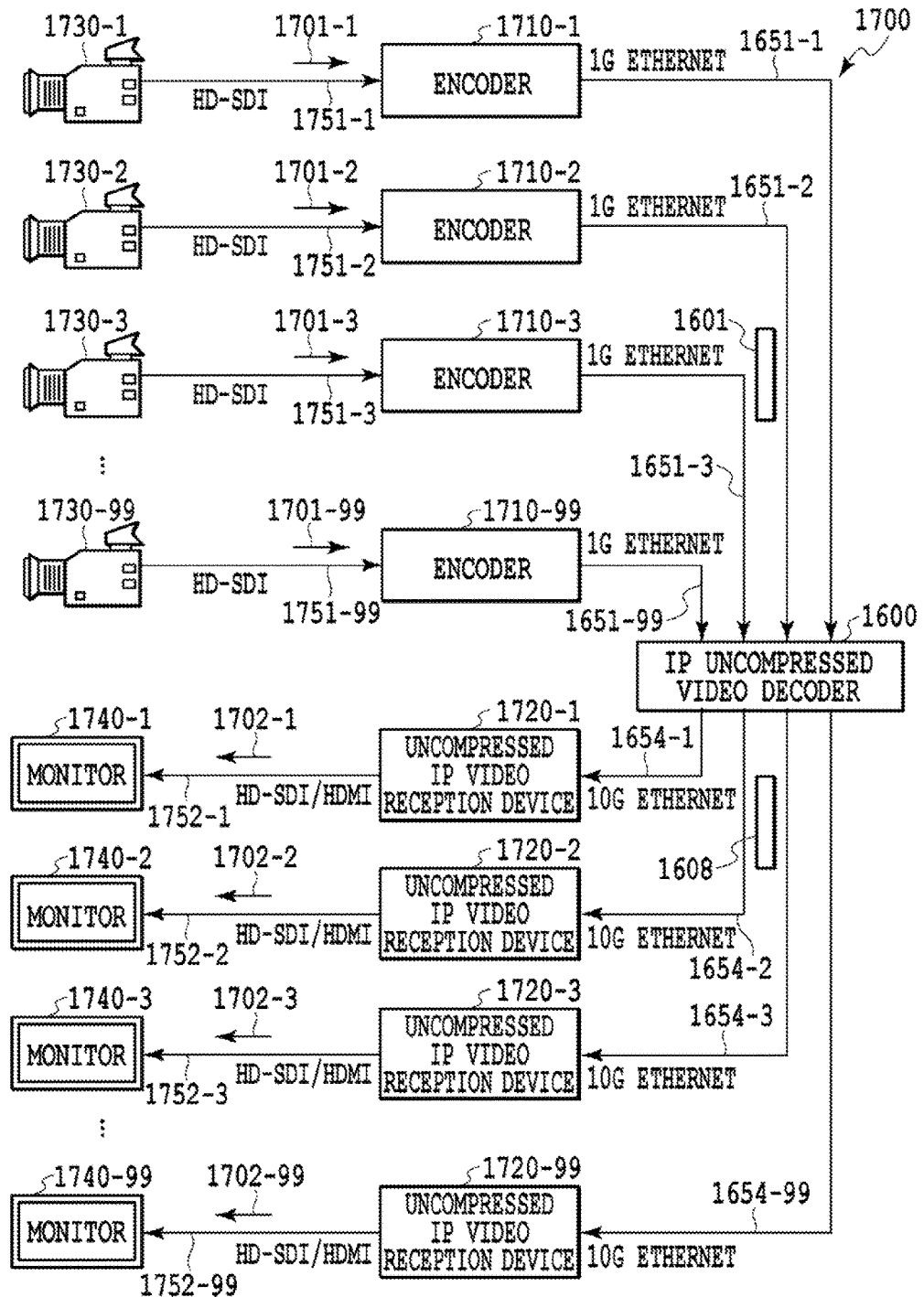
FIG. 17 is a configuration diagram of a video transmission system using the IP uncompressed video decoder of FIG. 16.

FIG. 17 is a configuration diagram illustrating a video transmission system 1700, which is a video transmission system using the IP uncompressed video decoder 1600 illustrated in FIG. 16. The video transmission system 1700 includes cameras 1730-1 to 1730-99, video encoders 1710-1 to 1710-99 respectively connected to the cameras 1730-1 to 1730-99 by HD-SDI coaxial cables 1751-1 to 1751-99, the IP uncompressed video decoder 1600 connected to the video encoders 1710-1 to 1710-99 by Gbps Ethernets 1651-1 to 1651-99, uncompressed IP video reception devices 1720-1 to 1720-99 connected to the IP uncompressed video decoder 1600 by 10G Ethernets 1654-1 to 1654-99, and monitors 1740-1 to 1740-99 respectively connected to the uncompressed W video reception devices 1720-1 to 1720-99 by HD-SDI coaxial cables or HDMI cables 1752-1 to 1752-99.

The video transmission system 1700 is a system for viewing arbitrary video shot by one camera among the cameras 1730-1 to 1730-99 on an arbitrary monitor among the monitors 1740-1 to 1740-99, and is able to forward the video from all cameras to all monitors.

The video encoders 1710-1 to 1710-99 accept HD-SDI uncompressed video signals 1701-1 to 1701-99 from the cameras 1730-1 to 1730-99 via respective coaxial cables 1751-1 to 1751-99 as input. The HD-SDI uncompressed video signals 1701-1 to 1701-99 input into the video encoders 1710-1 to 1710-99 are encoded according to H.264 coding, and transmitted over 1 Gbps Ethernets 1651-1 to 1651-99 as IP packet streams conforming to the FEC scheme and packet format of SMPTE 2022-10.

The uncompressed IP video reception devices 1720-1 to 1720-99 receive IP packet streams confirming to the FEC scheme and packet format of SMPTE 2022-5/6 from the 10G Ethernets 1654-1 to 1654-99, extract uncompressed video signals, and output HD-SDI or HDMI uncompressed video signals 1702-1 to 1702-99.

In the video transmission system 1700 of FIG. 17, for example, a stream 1601 that has been compressed and IP packetized by the video encoder 1710-2 is input to the IP uncompressed video decoder 1600 via the 1 Gbps Ethernet 1651-2, and converted into an IP packet stream 1608 of uncompressed video. The IF packet stream 1608 of uncompressed video is input from the IP uncompressed video decoder 1600 into the uncompressed IP video reception device 1720-3 via the 10 Gbp Ethernet 1654-3 selected by the transmitting-side switch 1642. In the uncompressed IP video reception device 1720-3, an uncompressed video signal is extracted from the IP packet stream of uncompressed video, output as an HD-SDI uncompressed video signal 1702-3 via the coaxial cable 1752-3, and displayed on the monitor 1740-3.

FIG. 18 is a flowchart from creation of an IP packet stream of compressed video from uncompressed video up to outputting of an H-SDI signal on the receiving side in the video transmission system 1700 of FIG. 17.

In step 1801, an HD-SDI video signal from the camera 1730-2 is, for example, encoded using H.264 coding by the video encoder 1710-2, IP packetized using the FEC scheme and packet format conforming to the SMPTE 2022-1/2 specification, and the IP packet stream 1601 is transmitted over the 1 Gbps Ethernet 1651-2.

In step 1802, the IP packet stream 1601 transmitted over the 1 Gbps Ethernet 1651-2 is input into the receiving-side switch 1641 of the IP uncompressed video decoder 1600, and forwarded by the receiving-side switch 1641 to the IP input interface unit 1610 of the IP decoder unit 1600-1, for example.

In step 1803, the IP packet stream 1601 undergoes checks in the IP layer, the UDP layer, and the RTP layer by the IP input interface unit 1610. An FEC process is conducted only on error-free IP packets for which the MAC address and the IP address match addresses required by the IP uncompressed video decoder 1600, whereas lost packets are recovered by error correction. A packet group including packets recovered by error correction is sent to the signal extraction unit 1621 of the decoder unit 1620.

In step 1804, the signal extraction unit 1621 inspects RTP sequence numbers in the IP packet stream, and for correct IP packets, removes the RTP, UDP, IP, and MAC headers, and extracts and forwards an MPEG-2 TS to the decoder control unit 1622. The decoder control unit 1622 extracts video data and 8-channel audio data from the MPEG-2 TS from the signal extraction unit 1621, and forwards the extracted data to the decoder 1623.

In step 1805, the decoder 1623 decodes the video data retrieved by the decoder control unit 1622 according to H.264 coding, and outputs an uncompressed video signal. In addition, the decoder 1623 decodes the 8-channel audio signal according to AAC, and outputs 8 channels of decoded audio data.

In step 1806, the audio embedding unit 1624 embeds the 8 channels of audio data output from the decoder 1623 into the uncompressed video signal also output from the decoder 1623, and products an uncompressed video signal with embedded audio.

In step 1807, the signal conversion unit 1625 IP packetizes the uncompressed video signal output from the audio embedding unit 1624 on the basis of the SMPTE 2022-6 specification by dividing the uncompressed video signal into units of fixed length, inserting the divided uncompressed video signal into RTP payloads, and adding an RTP header, a UDP header, and an IP header.

In step 1808, the IP output interface unit 1630 performs FEC computations on the IP packet stream output from the signal conversion unit 1625, and generates and adds FEC packets. Subsequently, a MAC header and an FCS are added to each IP packet, processing is conducted in the 10 Gbps Ethernet MAC sublayer, and the IP packets are forward to the transmitting-side switch interface 1653-1 as the IP packet stream 1608. The transmitting-side switch selects the 10 Gbps Ethernet 1654-3, for example, and forwards the IP packet stream.

In step 1809, the uncompressed video reception device 1720-3 extracts an uncompressed video signal from the IP packet stream 1608 of uncompressed video output by the IP uncompressed video decoder 1600, and outputs over the coaxial cable 1752-3. The HD-SDI uncompressed video signal 1702-3 output over the coaxial cable 1752-3 is displayed on the monitor 1740-3.

The above description regarding FIGS. 16, 17, and 18 is based on a configuration having both a receiving-side switch and a transmitting-side switch, but depending on the configuration of the network applying the present invention, application is also possible in which the network interface and the receiving means are joined directly without a receiving-side switch, or in which the transmitting means and the network interface are joined directly without a transmitting-side switch. Additionally, in the ease of performing a specific implementation of the present invention, using an Ethernet switch supporting Layer 2 or Layer 3 enables the receiving-side switch and the transmitting-side switch to be realized by using the same single switch.

Figure 5:
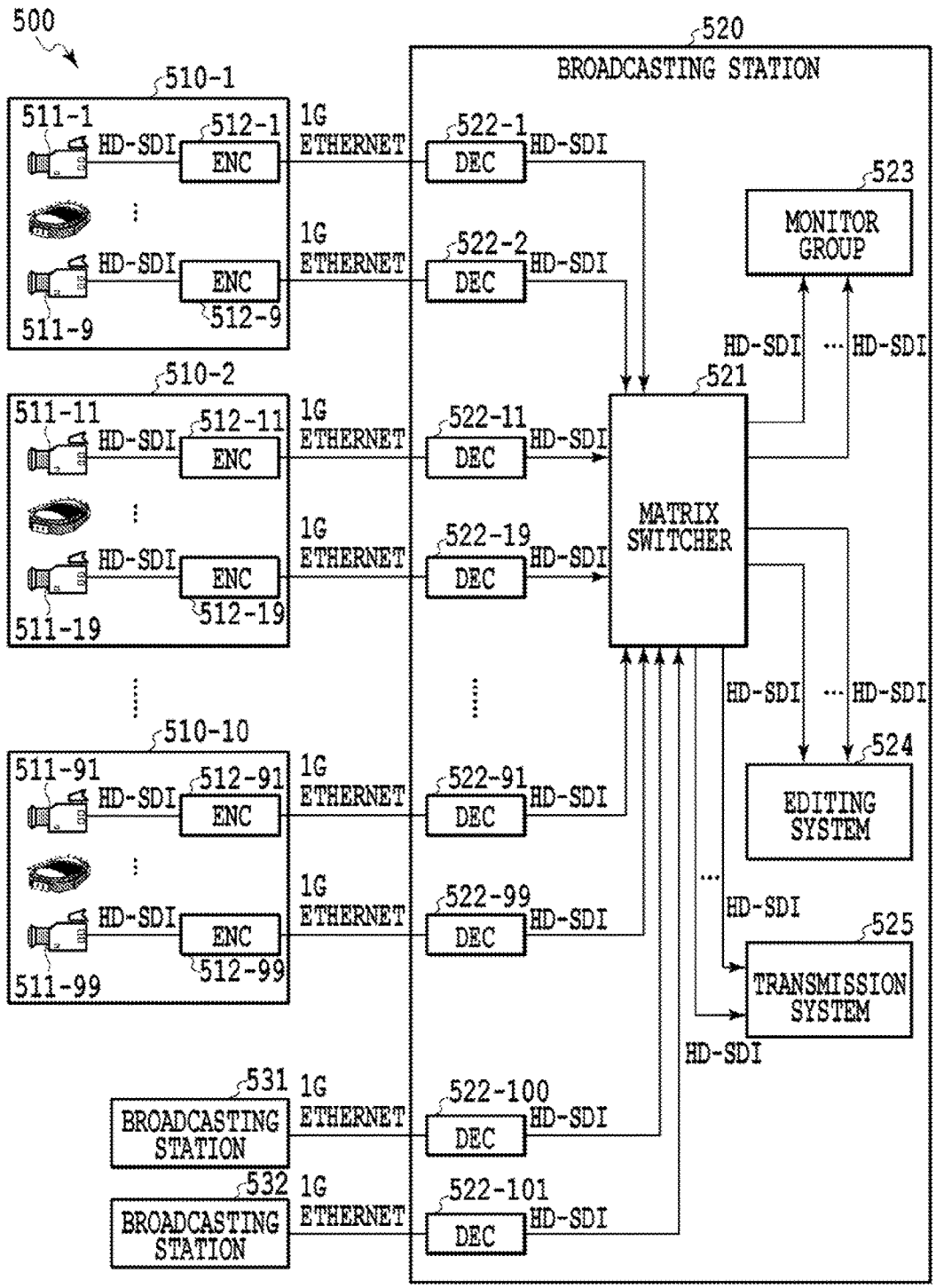
FIG. 5 is a configuration diagram illustrating a broadcasting system of the related art.
Figure 19:
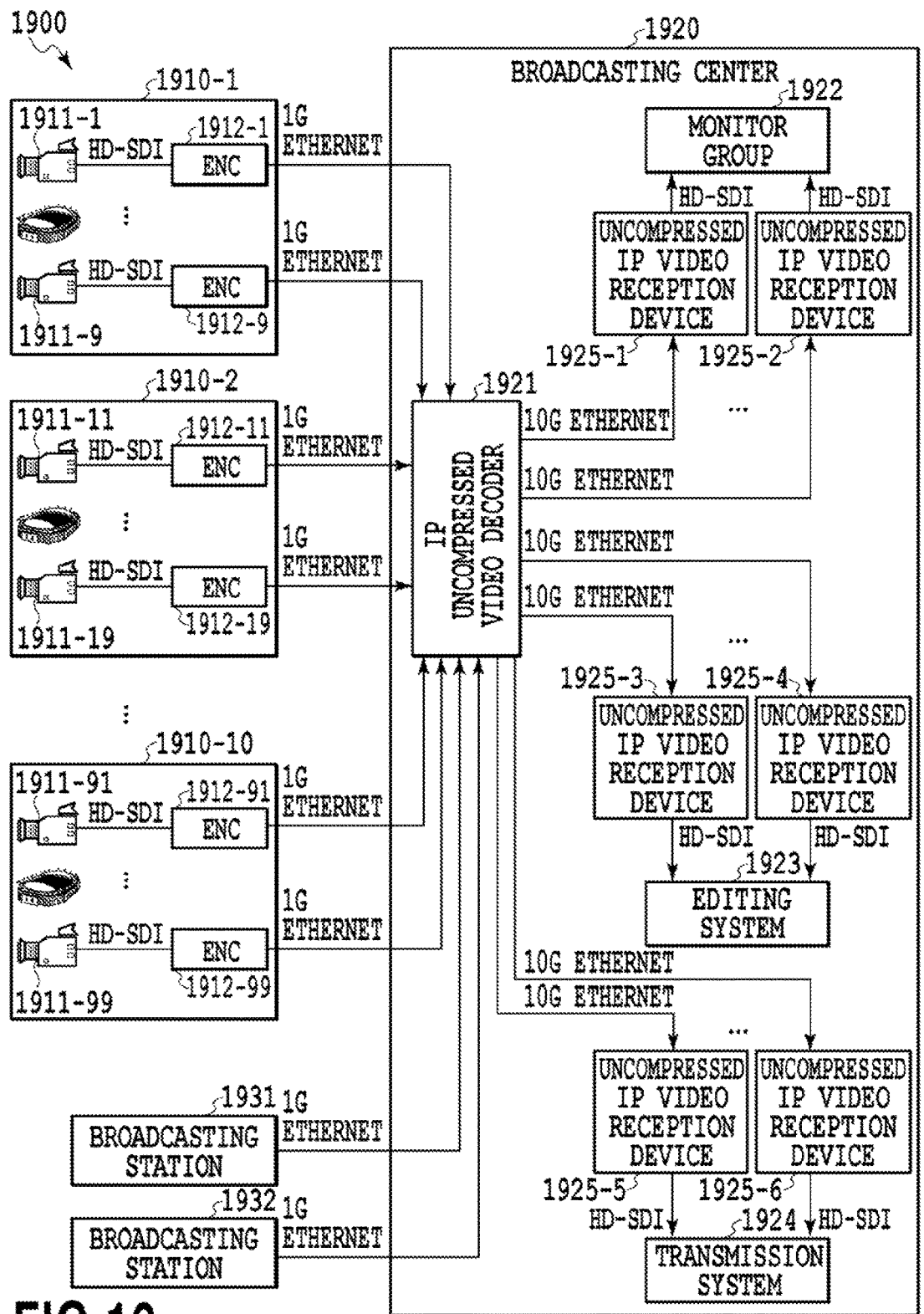
FIG. 19 is a configuration diagram of a video delivery system obtained by applying the IP uncompressed video decoder of FIG. 16 to a video delivery system of the related art.

FIG. 19 is a configuration diagram illustrating a video transmission system 1900 which, unlike a coaxial cable-based system of the related art, is designed to be used on an IP network, and applies the IP uncompressed video decoder 1600 of the present embodiment to the broadcasting system of FIG. 5.

In FIG. 19, video encoders 1912-1 to 1912-99 are installed in correspondence with respective cameras 1911-1 to 1911-99 in multiple stadiums 1910-1 to 1910-10, and uncompressed video from each camera in the stadiums is converted into an IP packet stream conforming to SMPTE 2022-1/2, and input into an IP uncompressed video decoder 1921 via a 1 Gbps Ethernet. IP packet streams from broadcasting stations 1931 and 1932 are also similarly input into the IP uncompressed video decoder 1921. In the IP uncompressed video decoder 1921, video data and audio data are retrieved from the input IP packet streams, decoded to create IP packet streams of uncompressed video conforming to SMPTE 2022-5/6, and transmitted over a 10 Gbps Ethernet connected to a monitor group 1922, an editing system 1923, a transmission system 1924, and the like using a receiving-side switch or a transmitting-side switch.

In the system of FIG. 19, the IP packet streams of IP packetized, compressed video are transmitted directly to the IP uncompressed video decoder of the present invention, and the IP packet streams to be decoded may be selected by a receiving-side switch, while in addition, the transmission destination of the created IP packet streams of uncompressed video as a result of decoding may be selected by a transmitting-side switch. Consequently, compared to the system of FIG. 5, it is possible to decrease the ratio of inactive equipment, and without using a costly matrix switcher, increase system flexibility and decrease costs for the laying of cable.

INDUSTRIAL APPLICABILITY

The present invention may be used in a system that handles multiple video data streams, such as a video transmission system for sports events, a video delivery system inside a broadcasting station, or the like.

100, 322-1 to 322-99, 422-1, 422-2, 512-1 to 512-99 Video encoder
200, 522-1 to 522-101 Video decoder
101 HD-SDI input interface
207 HD-SDI output interface
300, 400, 500, 1100, 1500, 1900 Video delivery system
310-1 to 310-10, 410-1 to 410-10, 510-1 to 510-10, 1110-1 to 1110-10, 1510-1 to 1510-10, 1910-1 to 1910-10 Arena
311-1 to 311-99, 411-1 to 411-99, 511-1 to 511-99, 930, 1111-1 to 1111-99, 1330-1 to 1330-99, 1511-1 to 1511-99, 1730-1 to 1730-99, 1911-1 to 1911-99 Camera
312-1 to 312-99, 412-1 to 412-99 E/O converter
320, 320, 520, 1130, 1520, 1920 Broadcasting center
321-1 to 321-99, 421-1 to 421-99 O/E converter
323, 423, 1131, 1521 Video transmission unit
424, 521 Matrix switcher
523, 1922 Monitor group
524, 1923 Editing system
525, 1924 Transmission system
531, 532, 1931, 1932 Broadcasting station
600, 1132 to 1134, 1200, 1522 IP uncompressed video encoder
120, 210, 601, 608, 1201, 1208, 1601, 1608 IP packet stream
602, 1202, 1607 Uncompressed video signal
603, 1203, 1605 Video data
604-1 to 604-8, 1204-1 to 1204-8, 1606-1 to 1606-8 Audio data
605, 1205, 1603 Compressed video PES
606-1 to 606-8, 1206-1 to 1206-8, 1604-1 to 1604-8 Compressed audio PES
607, 1207, 1602 MPEG-2 TS
201, 610, 1210, 1610 IP input interface unit
611, 1211, 1611 Packet processing unit
612, 1212, 1612 FEC processing unit
613, 1213, 1613 Buffer memory for FEC control
620, 1220 Encoder unit
202, 621, 1221, 1621 Signal extraction unit
102, 622, 1222 Encoder control unit
623, 1223 Encoder
105, 624, 1224 MPEG-2 TS multiplexer
106, 625, 1225, 1625 Signal conversion unit
103, 626, 1226 Video encoder
104, 627, 1227 Audio encoder
107, 630, 1230, 1630 IP output interface unit
631, 1231, 1631 Packet processing unit 632, 1232, 1632 FEC processing unit
633, 1233, 1633 Buffer memory for FEC control
651, 1251-1 to 1251-99, 1654-1 to 1654-99 10 Gbps Ethernet
121, 211, 652, 1254-1 to 1254-99, 1651-1 to 1651-99 1 Gbps Ethernet
900, 1300, 1700 Video transmission system
901, 902, 1301-1 to 1301-99, 1302-1 to 1302-99, 110, 220, 1701-1 to 1701-99, 1702-1 to 1702-99 HD-SDI video signal
903 HDMI video signal
910, 1112-1 to 1112-99, 1310-1 to 1310-99 Uncompressed video transmission device
920, 1320-1 to 1320-99 IP decoder
951, 952, 1351-1 to 1351-99, 1352-1 to 1352-99, 111, 1751-1 to 1751-99, 1752-1 to 1752-99 Coaxial cable
953 HDMI cable
1120 IP network
1241, 1641 Receiving-side switch
1242, 1642 Transmitting-side switch
1200-1 to 1200-4 IP encoder unit
1252-1 to 1252-4, 1652-1 to 1652-4 Receiving-side switch interface
1253-1 to 1253-4, 1653-1 to 1653-4 Transmitting-side switch interface
1240-1 to 1240-99, 1740-1 to 1740-99 Monitor
1600, 1921 IP uncompressed video decoder
1600-1 to 1600-99 IP decoder unit
203, 1622 Decoder control unit
1623 Decoder
206, 1624 Audio embedding unit
204, 1626 Video decoder
205, 1627 Audio decoder
1710-1 to 1710-99, 1912-1 to 1912-99 IP encoder
1720-1 to 1720-99, 1925-1 to 1925-6 Uncompressed IP video reception device

The invention claimed is:

1. A video decoder for connecting at least one first network for transmitting a IP packetized compressed video signal and at least one second network for transmitting a IP packetized uncompressed video signal, and for decoding the IP packetized compressed video signal received from the first network to transmit the IP packetized uncompressed video signal to the second network, comprising:
a decoder unit, including:
a receiver configured to receive, from the first network, the IP packetized compressed video signal including video data and audio data;
a processor configured to:
retrieve the video data and the audio data from the IP packetized compressed video signal;
decode the video data and the audio data;
include the decoded audio data in the decoded video data; and
create the IP packetized uncompressed video signal by IP packetizing the decoded video data and the decoded audio data; and
a transmitter configured to transmit the IP packetized uncompressed video signal to the second network.

2. The video decoder according to claim 1, further comprising:
a plurality of the decoding units;
a plurality of receiving-side network interfaces each connecting to at least the one first network; and
a receiving-side switch for receiving the IP packetized compressed video signal from the first network through the at least one of the plurality of receiving-side network interfaces and for selecting at least one decoder unit from among the plurality of decoder units to transmit the IP packetized uncompressed video signals.

3. The video decoder according to claim 1, further comprising:
a plurality of the decoding units;
a plurality of transmitting-side network interfaces each connecting to at least the one second network; and
a transmitting-side switch for receiving the IP packetized uncompressed video signal from the selected decoder units and for selecting at least one of the plurality of transmitting-side network interfaces to transmit the IP packetized uncompressed video signal to the second network.

4. The video decoder according to claim 1, further comprising:
a plurality of the decoding units;
a plurality of receiving-side network interfaces each connecting to at least the one first network;
a receiving-side switch for receiving the IP packetized compressed video signal from the first network through the at least one of the plurality of receiving-side network interfaces and for selecting at least one decoder unit from among the plurality of decoder units to transmit the IP packetized compressed video signals;
a plurality of transmitting-side network interfaces each connecting to at least the one second network; and
a transmitting-side switch for receiving the IP packetized uncompressed video signal from the selected decoder units and for selecting at least one of the plurality of transmitting-side network interfaces to transmit the IP packetized uncompressed video signal to the second network.

5. The video decoder according to claim 1, wherein the receiving-side switch uses the same switch as the transmitting-side switch.

* * * * *